US008041647B2

(12) United States Patent
Clater

(10) Patent No.: US 8,041,647 B2
(45) Date of Patent: Oct. 18, 2011

(54) SYSTEM AND METHOD FOR AN AUTOMATED PROJECT OFFICE AND AUTOMATIC RISK ASSESSMENT AND REPORTING

(75) Inventor: Gene Clater, Northampton, PA (US)

(73) Assignee: Computer Aid Inc., Allentown, PA (US)

( * ) Notice: Subject to any disclaimer, the term of this patent is extended or adjusted under 35 U.S.C. 154(b) by 1047 days.

(21) Appl. No.: 11/321,649

(22) Filed: Dec. 30, 2005

(65) Prior Publication Data

US 2006/0173762 A1  Aug. 3, 2006

Related U.S. Application Data

(60) Provisional application No. 60/640,104, filed on Dec. 30, 2004.

(51) Int. Cl.
*G06Q 40/00* (2006.01)
(52) U.S. Cl. .......................................... 705/301; 705/35
(58) Field of Classification Search ................ 705/35, 705/1, 7, 10, 38, 301
See application file for complete search history.

(56) References Cited

U.S. PATENT DOCUMENTS

| | | | |
|---|---|---|---|
| 6,223,143 B1* | 4/2001 | Weinstock et al. | ............. 703/17 |
| 7,149,699 B2 | 12/2006 | Barnard et al. | |
| 2002/0120490 A1 | 8/2002 | Gajewski et al. | |
| 2003/0195799 A1 | 10/2003 | Scholl et al. | |
| 2003/0204462 A1 | 10/2003 | Eisler | |
| 2004/0054610 A1 | 3/2004 | Amstutz et al. | |
| 2004/0143477 A1 | 7/2004 | Wolff | |
| 2004/0230468 A1* | 11/2004 | King et al. | ...................... 705/10 |
| 2005/0060213 A1 | 3/2005 | Lavu et al. | |
| 2005/0114829 A1 | 5/2005 | Robin et al. | |
| 2005/0246195 A1* | 11/2005 | Smith et al. | ....................... 705/1 |

OTHER PUBLICATIONS

"Primavera Professional Services," © 2005, Primavera Systems Inc., http://www.primavera.com/files/brochures/Professional_Services.pdf.
"Clarity (Niku)," accessed Dec. 19, 2005, http://www.niku.com/ww/products.asp?id=49#startCIO.
Ropponen, J. et al., Components of Software Development Risk: How to Address Them? A Project Manager Survey. IEEE Transactions on Software Engineering, Feb. 2000, vol. 26, No. 2, pp. 98-112.
Butler, S. et al., The Potential of Portfolio Analysis in Guiding Software Decisions. First Workshop on Economics-Driven Software Engineering Research (EDSER-1), affiliated with the 21st International Conference on Software Engineering (ICSE'99), May 1999, pp. 1-5.

* cited by examiner

*Primary Examiner* — Lalita Hamilton
(74) *Attorney, Agent, or Firm* — Blank Rome LLP

(57) ABSTRACT

In the automation of project risk identification, various qualitative and quantitative measures are combined to report a project's risk level, areas, and mitigation in an automatic and objective manner. The software package includes a risk assessment and report framework and a risk engine, a portfolio analysis, a project plan validator, an integrated project management office toolkit and process asset library, and an integrated skills tracking, locating and availability module with a skills engine.

18 Claims, 9 Drawing Sheets

SYSTEM AND METHOD FOR AN AUTOMATED PROJECT OFFICE AND AUTOMATIC RISK ASSESSMENT AND REPORTING

REFERENCE TO RELATED APPLICATIONS

The present application claims the benefit of U.S. Provisional Patent Application No. 60/640,104, filed Dec. 30, 2004, whose disclosure is hereby incorporated by reference in its entirety into the present disclosure.

Related disclosure is found in U.S. Provisional Patent Application No. 60/618,231, filed Oct. 14, 2004, and in U.S. patent application Ser. No. 11/249,744, filed Oct. 14, 2005, whose disclosures are hereby incorporated by reference in their entireties into the present disclosure.

FIELD OF THE INVENTION

The present invention is directed to a system and method for automation of project risk identification and in particular to such a system and method in which various qualitative and quantitative measures are combined to report a project's risk level, areas, and mitigation in an automatic and objective manner.

DESCRIPTION OF RELATED ART

In "Project Management Essentials" from MetaGroup, a statistical survey was conducted for 23,000 application development projects. The following results were projected:

26% succeeded: Project delivered on time and on budget to the client/customer.

46% challenged: Project completed over budget or past deadline.

28% failed: Project never completed.

The researchers found that the core issues with project success were mostly related to poor project management discipline. The root cause, or underlying problem, often is attributable to poor project estimating techniques, ineffective project team structure (team risks), a lack of client (end-user) participation, unmanaged scope changes, and taking on large-scale project risks without any contingencies.

Project management software was brought along to address these problems, but often fails to do so effectively.

SUMMARY OF THE INVENTION

It is therefore an object of the invention to overcome the above-noted deficiencies of the prior art. To that end, the present invention is directed to a system and method that, in various embodiments, can include the following functionalities.

Risk Assessment and Reporting

The Risk Assessment and Report Framework combines various project performance measurements as well as a comprehensive set of multifaceted questions to be processed by a risk engine to assess a project's level or risk, and the areas where risk exists. In addition to identifying risks, advice on mitigation of the identified risks, as well as tracking of mitigation actions is performed to enhance the system's ability to assess and provide future risk advice.

The framework collects data, either through Application Program Interfaces (APIs), or via direct data entry, on project performance measured by base Earned Value Analysis (EVA) data, quality data on defect rates, customer satisfaction ratings, manpower utilization, milestone progress. The risk engine uses the inputs to evaluate the performance against warning thresholds and limits to identify and report trouble. In the case of EVA, a set of performance indicators are calculated from the main performance input to determine schedule and cost performance, as well as the level of risk and recoverability of the schedule and cost.

In addition to the performance metrics and thresholds, the risk engine uses data from question sets that survey various aspects of the projects activities to assess risk in various areas. Each question set and possible answers are categorized, scored, and weighted in such a way as to identify potential risk areas, and these risks are then reported via a dashboard to the user.

Questions sets are formed from a large question pool that contains all possible questions, risk categories, answers, and scores. New question sets are built by selecting questions from the pool and storing the question set into a question set library. The risk identification is broken down into several levels of classification and increasing detail according to a risk structure of risk categories, that each category contains risk areas, and that each risk area contains risk attributes. Each question in the question pool is assigned to a particular risk attribute; thus, when incorporated into a question set, it becomes part of the risk engine's risk calculation.

The question sets are customizable and are assigned according to various classifications for a project. Classifications for the project include a portfolio and a project type. Projects are broken down into one or more portfolios or collections which have some common characteristic or interest (for example, a business unit or line of business, or a particular technology, etc.). Each portfolio has one or more question sets assigned to it that are used for assessment the elements of risk via the risk engine for all projects belonging to that portfolio. In addition to the portfolio assigned question sets, there are project type questions sets. Each project has a type classification assigned to it, and that type automatically incorporates risk question set appropriate for the particular project type. In addition to these two question set associations, each project can add any additional or supplemental question sets as needed to expand the risk assessment coverage.

In addition to the portfolio, project type, and supplemental question sets, the risk engine provides for a role association for the question sets at each of those levels. The roles allow users with different roles/responsibilities to provide input to the risk engine and have those perspectives combined into an overall risk assessment, and to identify differences in views for establishing consensus within a project. The roles can include (but are in no way limited to) a Project Manager, a Quality Engineer, or a Project Sponsor.

The risk engine provides a facility for periodically "running" or stepping through the question sets for each project. The risk engine assembles the question sets, eliminates any duplication or overlap between question sets (as different question sets can share any number of questions from the larger question pool), and present a user with an orderly, unique, questionnaire. Users are required to periodically go through the question sets to update the risk assessments and to provide risk trend analysis. Each user that has a particular role for a project creates an answer session for the questionnaire, and is presented with all questions appropriate for the role, portfolio, project type, and supplemental questions. Once all questions have be satisfactorily answered, the answers are submitted and the risk engine computes and updates the risk assessment for the project.

The risk engine combines the risk assessment scores, and metric scores from the EVA, quality, customer satisfaction, manpower, and progress, and reports those on a project or portfolio dashboard using a "stop light" kind of indicator (green, yellow/amber, red), to indicate an overall level of risk. The overall risks can be "drilled" down on via a web browser based interface to display increasing levels of detail of the risk status. This drill down continues to the level of the questions and answers or metrics that are driving the overall status. Where risks have been identified by the risk engine, mitigation advice is made available to the user to identify actions to take that are appropriate to mitigate each risk.

Along with the mitigation advice is a mechanism for recording and tracking the mitigation actions taken and the results of those actions for automatic incorporation into the mitigation advice to provide heuristics to the mitigation component of the risk engine, providing all projects with improved mitigation advice as the risk engine continues to collect data.

Portfolio Analysis

The Automated Project Office (APO) integrates a Portfolio Analysis function that allows an organization to track its projects according to a high-level classification system that allows for understanding a particular project footprint or balance of efforts relative to an overall goal. In particular, the preferred embodiment incorporates the MIT Model of portfolio classification, and uses it to perform a (classification) balance analysis, although those skilled in the art who have reviewed the present disclosure will appreciate that other models can be used instead of or in addition to the MIT model. For example, the MIT Model classifies projects as Infrastructure, Transactional, Informational, or Strategic, and uses the relative distributions of projects to those classifications to determine a position or balance for Cost Focused portfolio, Agility portfolio, or Balanced Cost and Agility portfolio. Through the APO, and organizations portfolio (of projects) can be tracked and measured according to the target position desired.

In addition to the MIT Model for portfolio classification, a user can create new models with any classifications desired, and use them in the same way as the MIT Model. A project can be assigned as many portfolio/portfolio classifications as desired, and have all tracked and reported via a common dashboard via a web browser.

Project Plan Validator

The APO integrates a Project Plan Validator facility using project heuristics to measure proposed project plan efforts by phase against known plan performance statistics for general project phases to determine if the plan contains the right work breakdown and effort distribution. Using the validator, a project manager can quickly see if too much or too little time has been allocated to critical phases of the project, and make adjustments before the plan is baselined and commitments are made for delivery dates. The validator uses statistics from completed projects to set the distribution of effort for a particular kind of project and can then be given, for example, a single number covering a single element from a plan, and determine the efforts by phase and total effort necessary for the project to be completed.

Integrated Project Management Office Toolkit and Process Asset Library

The APO integrates a Project Management Office (PMO) Toolkit and Process Asset Library (PAL). The toolkit provides essential documents and templates that correspond to PMO best practices, and additionally is coupled with the risk engine's mitigation advise to ensure the tools for risk mitigation are given additional visibility and tracking in the APO. The integrated PAL allows documents and tools used by other APO projects to be shared and their usage automatically tracked by the APO to provide powerful means of identifying organizational best practices and tools. The tracking allows for locating high value, high usage items, and pruning of low value, unused items at appropriate time.

Integrated Skills Tracking, Locating, and Availability

The Skills Engine of the APO provides a facility for tracking an organization's, or sub-unit's of the organization's people resources. The Skills Engine provides first, and "inventory" of all skills within the organization or sub-organization using the APO. Beyond the skills inventory, the engine provides tracking of the resources and skills assigned to projects and with a view toward when the resources and associated skills will be available for further allocation as well as aiding in reallocation of skills and resources to other projects. The Skills Engine provides for a skills search facility to locate resources with the skills needed for a project. In addition to the location of resources with needed skills, the engine allows for those resources to have a "claim" placed on them. The claim facility can either be hard or soft. A hard claim can be made for resources being placed on a project that has been contracted and has a start assigned. A soft claim is made for resources for a project that is not formally committed to, but allows for identification of intent to utilize particular resources in the future. This capability of the engine gives managers and project managers a facility to identify what resources are to be used, and to act early on allocation of resources, resolution of resource conflicts, and identification of new resources with particular skill that need to be obtained.

The skills engine also provides a tracking of overall availability of the resources and skills in the organization with notifications and warnings for resources who are under allocated (relative to their defined availability), or not allocated at all. As part of this engine's processing, and outlook for the utilization that looks into the future alerts managers of upcoming under utilization, which provide a means to avoid lost organizational productivity because the resource might otherwise be left idle.

BRIEF DESCRIPTION OF THE DRAWINGS

A preferred embodiment of the present invention will be set forth in detail with reference to the drawings, in which:

FIG. 3 shows a data model for PODS of FIG. 2;

DETAILED DESCRIPTION OF THE PREFERRED EMBODIMENT

Figure 1:
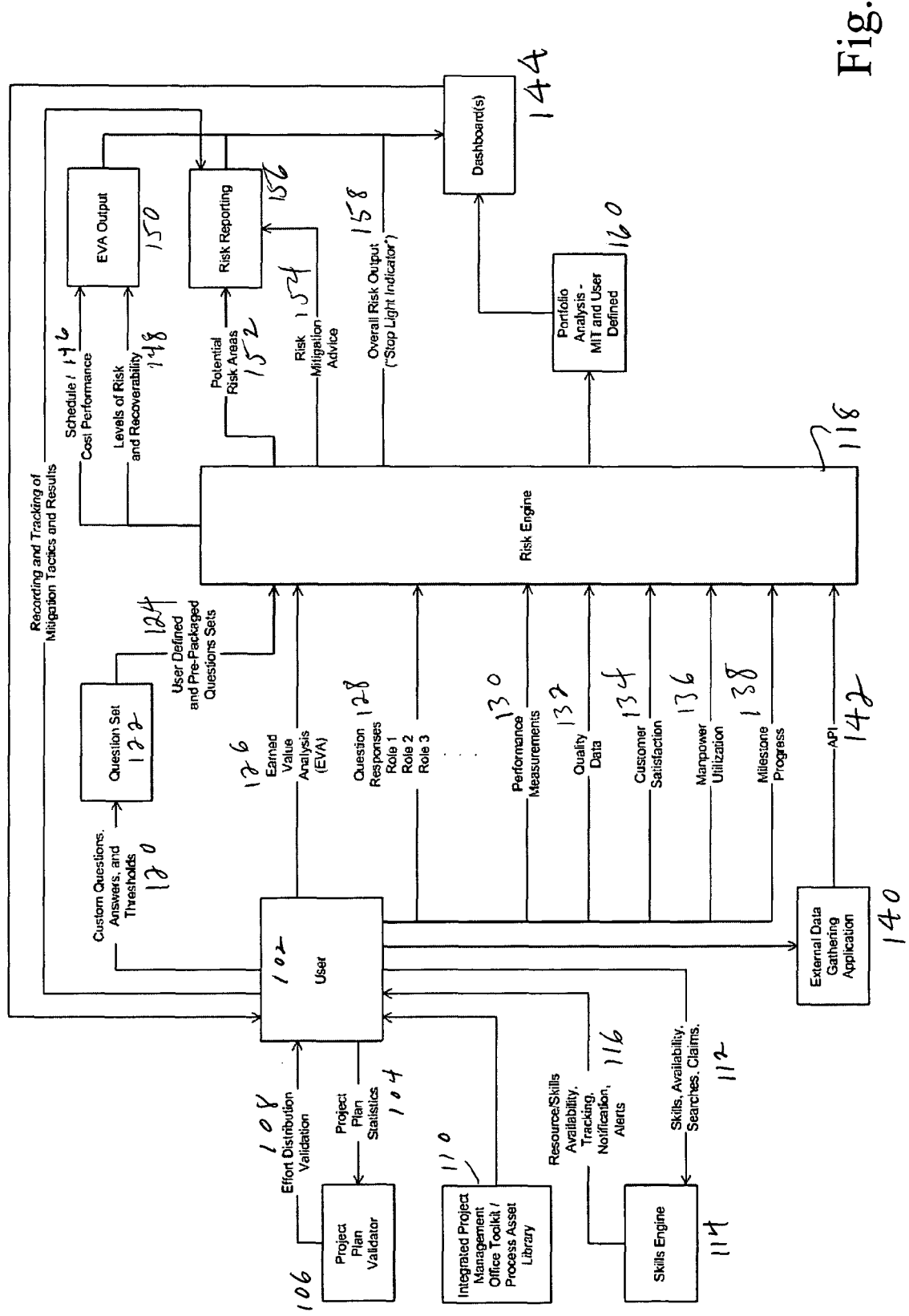
FIG. 1 shows a use-case diagram of the preferred embodiment.

A preferred embodiment will be disclosed in detail with reference to the drawings, in which like reference numerals refer to like elements or operational steps throughout.

An overview of the functionality of the preferred embodiment is shown in the use case diagram of FIG. 1. The user 102 supplies project plan statistics 104 to a project plan validator 106, which returns effort distribution validation 108 to the user 102. The integrated project management office toolkit/process asset library 110 supplies information to the user 102. The user 102 supplies information on the skills and availability of workers as well as searches and claims for such workers, collectively designated 112, to a skills engine 114, which returns information 116 on resource and skill availability, tracking, notification, and alerts to the user 102.

The user 102 interacts in the following manner with the risk engine 118. The user 102 forms custom questions, answers, and thresholds 120 into a question set 122, which becomes one of the user-defined and pre-packaged question sets 124 used by the risk engine 118. The user 102 supplies the following input to the risk engine 118: earned value analysis (EVA) 126, question responses 128, performance measurements 130, quality data 132, customer satisfaction information 134, staff power utilization information 136, and milestone progress 138. Also, an external data gathering application 140 can gather data from the user 102 and supply such data to the risk engine 118 through an application programming interface (API) 142.

The results of the operations performed by the risk engine 118 are output to the user 102 through one or more dashboards 144, which are user interfaces that provide such results in visual form. The risk engine 118 determines schedule and cost performance 146 and levels of risk and recoverability 148 and outputs them in the form of the EVA output 150 to the dashboards 144. The risk engine determines potential risk areas 152 and risk mitigation advice 154 and outputs them in the form of risk reporting 156 to the dashboards 144. The risk reporting 156 can also include input directly from the user 102. The risk engine can output an overall risk output 158 to the dashboards 144; the overall risk output can include a "stop light" indication for display on the dashboards 144 if the level of risk warrants it. The risk engine 118 outputs information to a portfolio analysis 160, which can be standard or user-defined, which is output to the dashboards 144.

Figure 2:
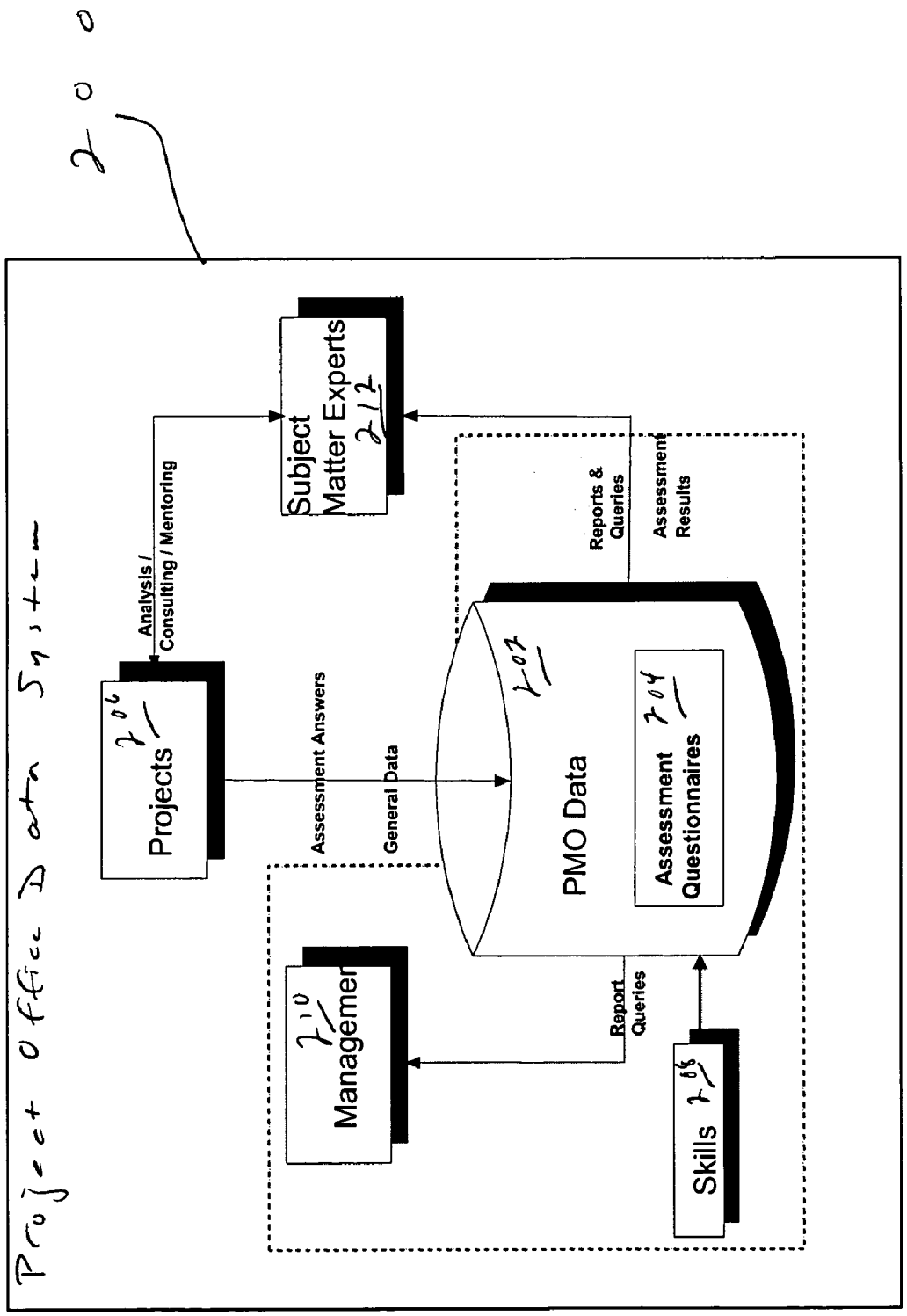
FIG. 2 shows a schematic overview of a Project Office Data System (PODS) on which the process of FIG. 1 can be implemented.

The functionality shown in FIG. 1 and described above is implemented on a Project Office Data System (PODS), shown in FIG. 2 as 200. The PODS 200 is centered on a Project Management Office (PMO) database 202 which stores, among other things, assessment questionnaires 204. The database receives information on projects 206 and skills 208 and allows reporting and querying by management 210 and subject matter experts (SME's) 212.

Figure 3:
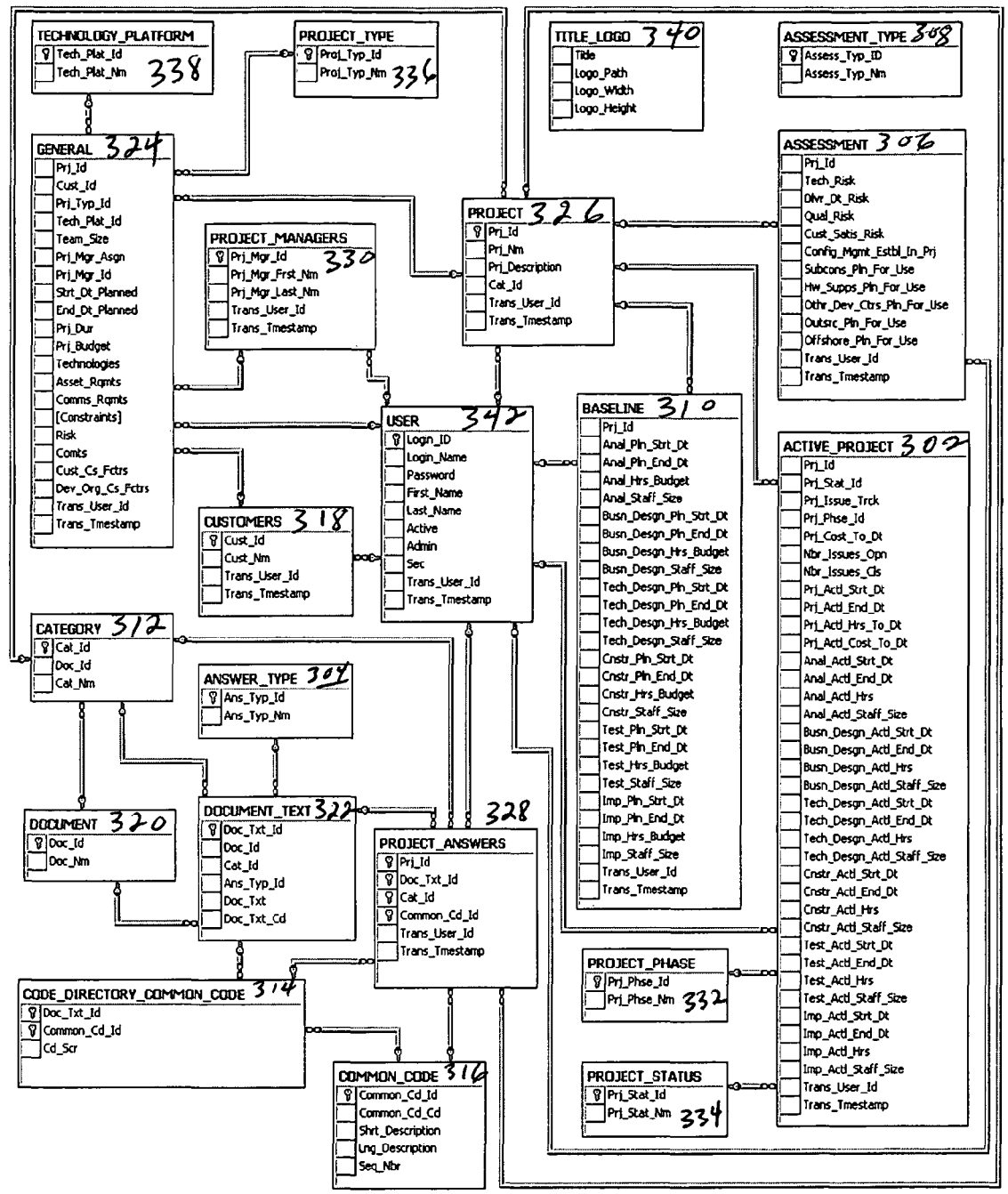
FIG. 3 shows

FIG. 3 shows a data model 300 for PODS. Table I below provides a brief description of the tables in the database.

TABLE I

| Table Name | Description |
| --- | --- |
| Active_Project 302 | Stores Active Project information identified by the Prj_Id field |
| Answer_Type 304 | Stores information for all Answer type available identified by the Ans_Typ_Id field |
| Assessment 306 | Stores Project Initiation-Assessment information identified by the Prj_Id field |
| Assessment_Type 308 | Stores information for all Assessment type available identified by the Assess_Typ_Id field |
| Baseline 310 | Stores Project Initiation-Baseline information identified by the Prj_Id field |
| Category 312 | Stores Category information identified by the Cat_Id field |
| Code_Directory_Common_Code 314 | Stores Code Directory Common Code (list of scores for each question and answer combination) information identified by the Doc_Txt_Id and Common_Cd_Id field |
| Common_Code 316 | Stores common code (list of answers) information identified by the Common_Cd_Id field |
| Customers 318 | Stores Customers information identified by the Cust_Id field |
| Document 320 | Stores Document information identified by the Doc_Id field |
| Document_Text 322 | Stores Document Text (list of questions for each category) information identified by the Doc_Txt_Id field |
| General 324 | Stores Project Initiation-General information identified by the Prj_Id field |
| Project 326 | Stores Project information identified by the Prj_Id field |
| Project_Answers 328 | Stores Project Answers (answers for each question) information identified by the Prj_Id, Doc_Txt_Id, Cat_Id and Common_Cd_Id field |
| Project_Managers 330 | Stores Project Managers information identified by the Prj_Mgr_Id field |
| Project_Phase 332 | Stores information for all Project phase available identified by the Prj_Phse_Id field |
| Project_Status 334 | Stores information for all Project status available identified by the Prj_Stat_Id field |
| Project_Type 336 | Stores information for all Project type available identified by the Proj_Typ_Id field |
| Technology_Platform 338 | Stores information for all Technology Platform available identified by the Tech_Plat_Id field |
| Title_Logo 340 | Stores Title and Logo information |
| User 342 | Stores User information identified by the Login Id field |

Figure 4:
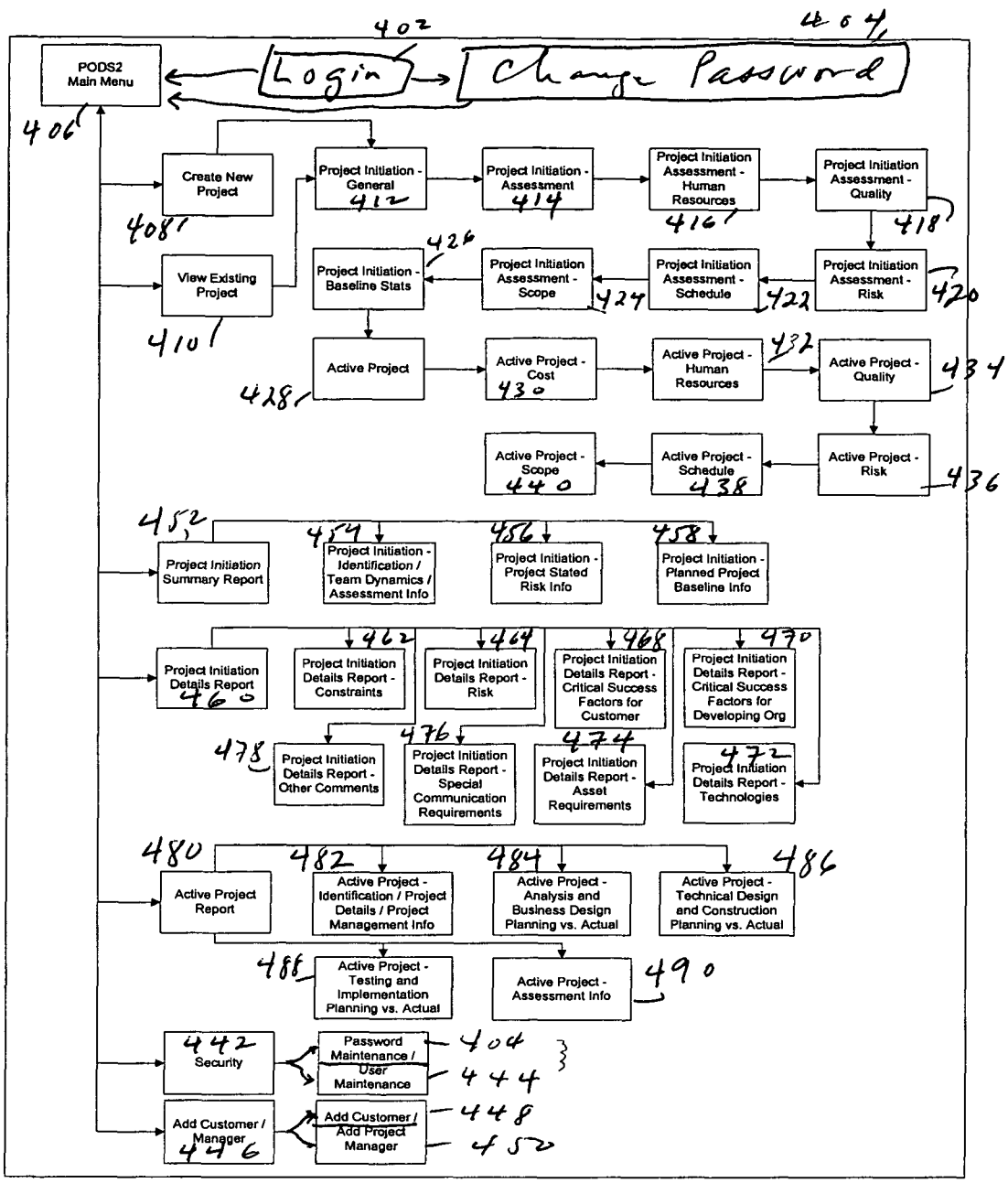
FIG. 4 shows a flow chart of the operations of the preferred embodiment.
Figure 5:
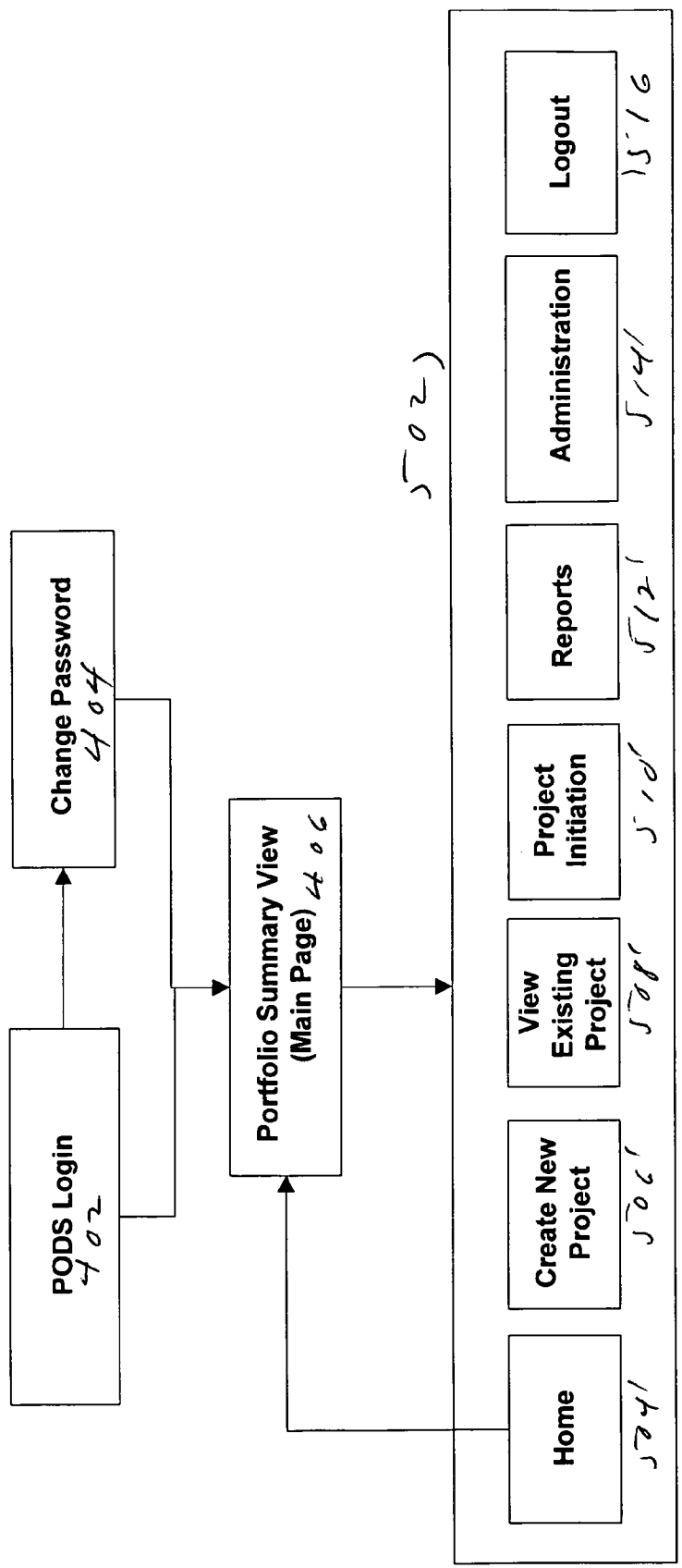
FIG. 5 shows a main screen flow chart.
Figure 6:
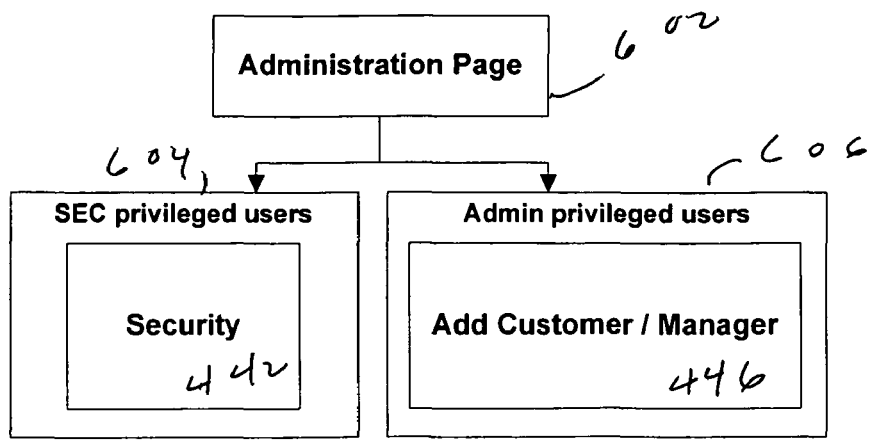
FIG. 6 shows an administration screen flow chart.
Figure 9:
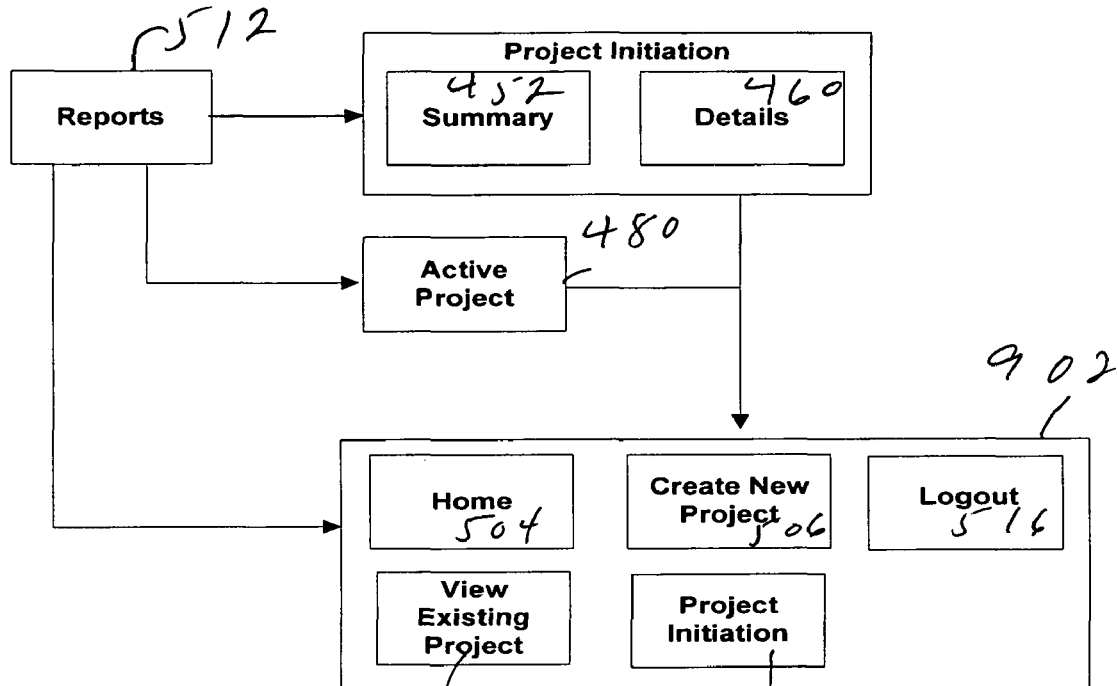
FIG. 9 shows a flow chart of the reports.
Figure 7:
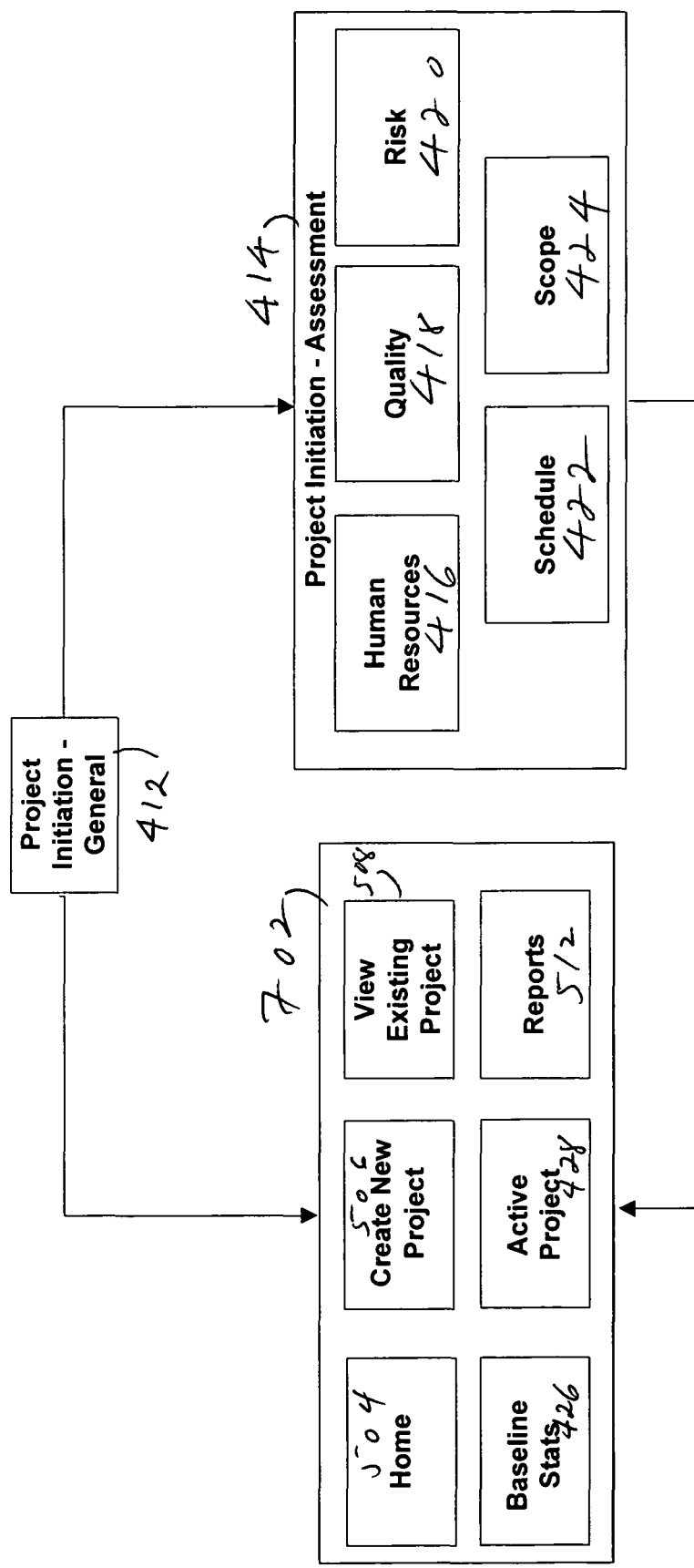
FIG. 7 shows a project initiation screen flow chart.
Figure 8:
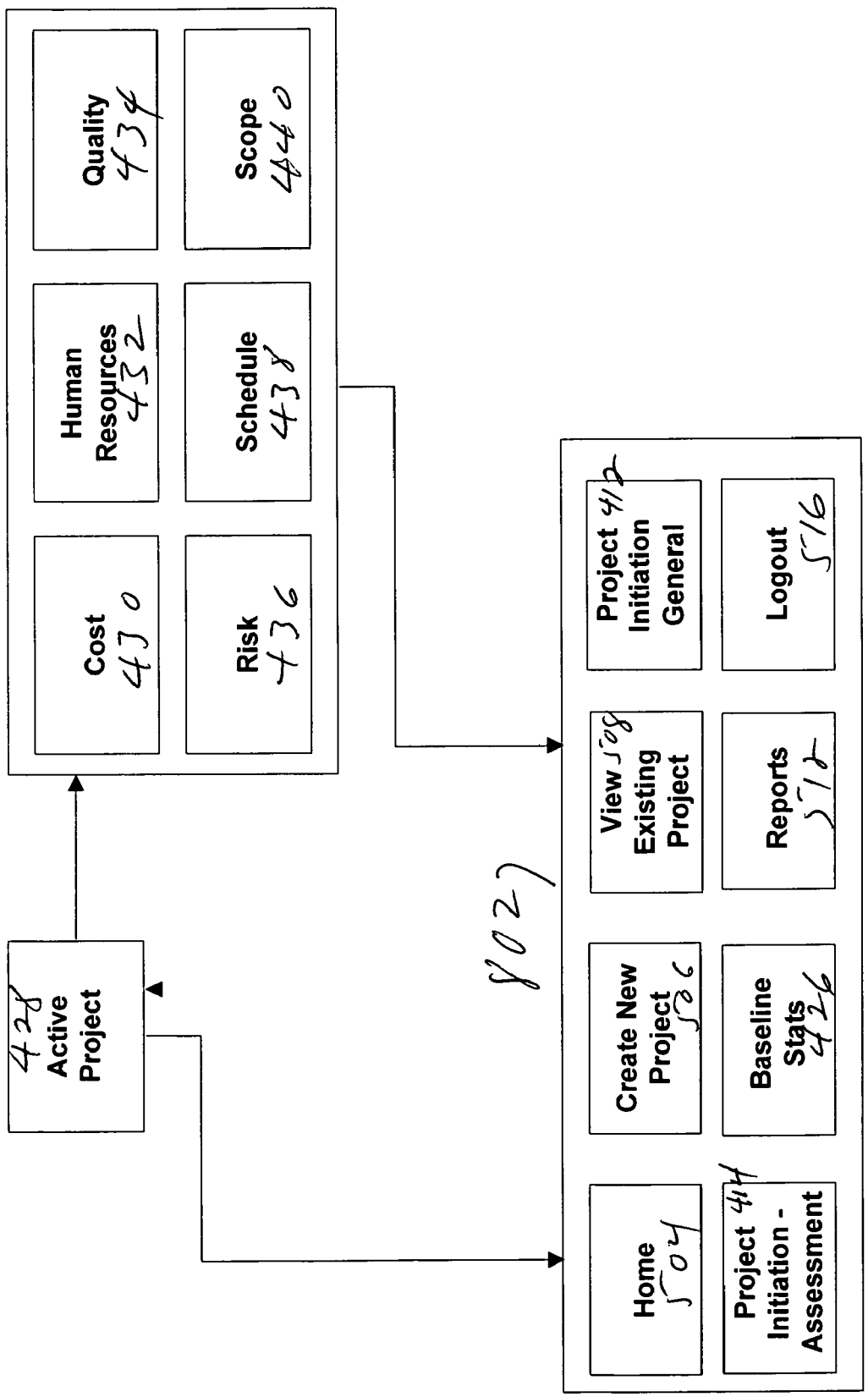
FIG. 8 shows an active project screen flow chart.

The operations of the preferred embodiment will now be explained with reference to FIGS. 4-9. FIG. 4 shows a flow chart of the operations of the preferred embodiment. FIG. 5 shows a main screen flow chart. FIG. 6 shows an administration screen flow chart. FIG. 7 shows a project initiation screen flow chart. FIG. 8 shows an active project screen flow chart. FIG. 9 shows a flow chart of the reports.

The PODS application Login page 402 protects the application and its resources from being accessed by unauthorized users. Only Active users are allowed to access the application. To access the application, the user is required to provide his/her login name and password. The login page is located in the root directory.

The login page is where the user types in his or her login name and password to gain access to the PODS application. The user can specify whether after successful login to show first the password maintenance page 404 to update his or her current password. This can be accomplished by checking the checkbox "Change my password after successful login" before clicking on the Login button. If this is not checked, after successful login the user is transferred instead into the home page 406.

If the user typed in an invalid login name or password, the login page would display the message "Invalid Login name/Password combination" to inform the user.

To validate the password supplied by the user, retrieve the hashed password string in the database for the login name supplied. Remove and keep the 2 salt characters from the hashed password string retrieved. Add the salt characters to the front of the password string supplied by the user to make a new password string. Use MD5 algorithm to hash the new password string into a new hashed password string and convert it to an ASCII hex string, creating a new "hexified" password string. Compare the new "hexified" password string to the hashed password string retrieved from the database. If the passwords match, the user is allowed to access the application; otherwise, the password supplied is invalid, and login is denied.

The home page 406, also known as the Portfolio Summary View Page, is displayed upon successful login. It contains two table summaries: Active Projects and Completed Projects. These tables show a general overview of the status of the different projects. The Active Projects table displays ongoing projects. The Completed Projects table displays finished projects. By default, the projects in the both tables are sorted by project name in ascending order. The data in both tables can also be sorted (ascending order) by column headings.

The Home page (Portfolio Summary view) provides a list of Active Projects and Completed Projects sorted by Project Name at the outset upon loading. The User has the option to sort the tables by clicking on the column headings. The content of this page is retrieved from the different tables in the database.

The home page is located in the root directory and is protected through user authentication. All users are allowed to view this page once they have been authenticated and session is still valid.

The Create New Project page 408 allows the user to define a new project. Both the Project Name and description are required fields. The project ID is automatically generated upon creation of a new project.

The Create new project page is located in the root directory and is protected through user authentication. All users are allowed to view this page once they have been authenticated and session is still valid.

The View Existing Project page 410 lists the Active Projects and Completed/Cancelled Projects based on the search criteria defined by the user. If no search criteria is selected, it will display the projects grouped by Active and Completed/Cancelled status once the user clicks on the search button. To view Project details, the user simply double-clicks the preferred project and he/she will be redirected to the Project Initiation—General page.

The View Existing Project page 410 serves as a facility to filter projects by Customer, Project Manager, or Project Type. The Completed/Cancelled Projects list enumerates all projects that were finished or were called-off. The Active Projects list enumerates all ongoing projects. All projects in both lists can be double-clicked to show the page that corresponds to the current phase of the project.

The view existing project page 410 is located in the root directory and is protected through user authentication. All users are allowed to view this page once they have been authenticated and session is still valid.

The Project Initiation—General page 412 permits the user to define or update the Project Initiation—General details of a new or existing project. The save button will appear for projects whose Project Initiation—General information has not yet been defined. Otherwise, an update button will appear. The user can save the data in the database at any point, at any level of completion, but can only advance to the next page once all the fields have been filled-up. After saving the data in the database and if all the fields in the page have been filled-up, the user will be asked if he wants to proceed to the next page or go back to the home page.

This page is located in the data attributes directory and is protected through user authentication. All users will be allowed to view this page once they have been authenticated and session is still valid.

The Project Initiation—Assessment page 414 permits the user to define or update the Project Initiation—Assessment details of a new or existing project. The save button will appear for projects whose Project Initiation—Assessment information has not yet been defined. Otherwise, an update button will appear. The user can save the data in the database at any point, at any level of completion, but can only advance to the next page once all the fields have been filled-up. After saving the data in the database and if all the fields in the page have been filled-up, the user will be asked if he wants to proceed to the next page or go back to the home page.

This page is located in the data attributes directory and is protected through user authentication. All users will be allowed to view this page once they have been authenticated and session is still valid.

The Project Initiation—Assessment page provides users the facility to define and/or update general project assessment information. A set of determinants are presented together with a set of possible answers to which the users can select from. There are two (2) buttons at the end of the page. These are the Save/Update button and the Clear button. The Save button appears for newly-defined projects while the Update button appears for projects whose General Project Assessment information has already been defined.

The Project Initiation Assessment—Human Resources page 416 permits the user to define or update the Project Initiation Assessment—Human Resources details of a new or existing project. The save button will appear for projects whose Project Initiation Assessment—Human Resources information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Project Initiation Assessment—Human Resources page provides users a series of questions regarding the Human Resource aspect of a new project. A set of answers for each question are presented but only one can be selected. There are two (2) buttons at the end of the page. These are the Save/Update button and the Clear button. The Save button appears for newly-defined projects while the Update button appears for projects whose Project Initiation Assessment for Human Resource information has already been defined.

The contents of this page are dynamically loaded based on the data retrieved from the different tables in the database based on the category. This page is located in the questionnaires directory and is protected through user authentication. All users will be allowed to view this page once they have been authenticated and session is still valid.

The Project Initiation Assessment—Quality page 418 permits the user to define or update the Project Initiation Assessment—Quality details of a new or existing project. The save button will appear for projects whose Project Initiation Assessment—Quality information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Project Initiation Assessment—Quality page displays a set of questions regarding the Quality aspect of a new project. A set of answers for each question are presented but only one can be selected. There are two (2) buttons at the end of the page. These are the Save/Update button and the Clear button. The Save button appears for newly-defined projects while the Update button appears for projects whose Project Initiation Assessment for Quality information has already been defined.

The contents of this page are dynamically loaded based on the data retrieved from the different tables in the database based on the category. This page will be located in the questionnaires directory and is protected through user authentication. All users will be allowed to view this page once they have been authenticated and session is still valid.

The Project Initiation Assessment—Risk page 420 permits the user to define or update the Project Initiation Assessment—Risk details of a new or existing project. The save button will appear for projects whose Project Initiation Assessment—Risk information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Project Initiation Assessment—Risk page displays a set of questions regarding the Risk aspect of a new project. A set of answers for each question are presented but only one can be selected. There are two (2) buttons at the end of the page. These are the Save/Update button and the Clear button. The Save button appears for newly-defined projects while the Update button appears for projects whose Project Initiation Assessment for Risk information has already been defined.

The contents of this page are dynamically loaded based on the data retrieved from the different tables in the database based on the category. This page will be located in the questionnaires directory and is protected through user authentication. All users will be allowed to view this page once they have been authenticated and session is still valid.

The Project Initiation Assessment—Schedule page 422 permits the user to define or update the Project Initiation Assessment—Schedule details of a new or existing project. The save button will appear for projects whose Project Initiation Assessment—Schedule information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Project Initiation Assessment—Schedule page displays a set of questions regarding the Schedule aspect of a new project. A set of answers for each question are presented but only one can be selected. There are two (2) buttons at the end of the page. These are the Save/Update button and the Clear button. The Save button appears for newly-defined projects while the Update button appears for projects whose Project Initiation Assessment for Schedule information has already been defined.

The contents of this page are dynamically loaded based on the data retrieved from the different tables in the database based on the category. This page is located in the questionnaires directory and is protected through user authentication. All users will be allowed to view this page once they have been authenticated and session is still valid.

The Project Initiation Assessment—Scope page 424 permits the user to define or update the Project Initiation Assessment—Scope details of a new or existing project. The save button will appear for projects whose Project Initiation Assessment—Scope information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Project Initiation Assessment—Scope page displays a set of questions regarding the Scope aspect of a new project. A set of answers for each question are presented but only one can be selected. There are two (2) buttons at the end of the page. These are the Save/Update button and the Clear button. The Save button appears for newly-defined projects while the Update button appears for projects whose Project Initiation Assessment for Scope information has already been defined.

The contents of this page are dynamically loaded based on the data retrieved from the different tables in the database based on the category. This page is located in the questionnaires directory and is protected through user authentication. All users will be allowed to view this page once they have been authenticated and session is still valid.

The Project Initiation—Baselines 426 page permits the user to define or update the Project Initiation—Baselines details of a new or existing project. The save button will appear for projects whose Project Initiation—Baselines information has not yet been defined. Otherwise, an update button will appear. The user can save the data in the database at any point, at any level of completion, but can only advance to the next page once all the fields have been filled-up. After saving the data in the database and if all the fields in the page have been filled-up, the user will be asked if he wants to proceed to the next page or go back to the home page.

The Project Initiation—Baselines page serves as a facility where users can define and/or update information like planned start date, planned hours budget and planned staffing size for each phase of a project. There are two (2) buttons at the end of the page. These are the Save/Update button and the Clear button. The Save button appears for newly-defined projects while the Update button appears for projects whose Project Initiation Baseline information has already been defined.

This page is located in the data attributes directory and is protected through user authentication. All users will be allowed to view this page once they have been authenticated and session is still valid.

The Active Project—General page 428 permits the user to define or update the Active Project—General details of an active project. The save button will appear for active projects whose Active Project—General information has not yet been defined. Otherwise, an update button will appear. The user can save the data in the database at any point, at any level of completion, but can only advance to the next page once all the fields have been filled-up. After saving the data in the database and if all the fields in the page have been filled-up, the user will be asked if he wants to proceed to the next page or go back to the home page.

This page will be located in the data attributes directory and is protected through user authentication. All users will be allowed to view this page once they have been authenticated and session is still valid.

The Active Project—General page displays the details and basic information of an active project. This serves as a facility where each detail item can be updated to reflect current changes in the status of the project (still active/completed/cancelled), project cost to date and others. There are two (2) buttons at the end of the page. These are the Save/Update button and the Clear button. The Save button appears for active projects whose general information has not yet been defined while the Update button appears for active projects whose general information has been previously defined.

The Active Project—Cost page 430 permits the user to define or update the Active Project—Cost details of an active project. The save button will appear for active projects whose Active Project—Cost information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Active Project—Cost page displays specific questions regarding the Cost aspect of an active project. A set of answers for each question are presented but only one can be selected. There are two (2) buttons at the end of the page. These are the Save/Update button and the Clear button The Save button appears for active projects whose cost information has not yet been defined while the Update button appears for active projects whose cost information has been previously defined.

The contents of this page are dynamically loaded based on the data retrieved from the different tables in the database based on the category. This page is located in the questionnaires directory and is protected through user authentication. All users will be allowed to view this page once they have been authenticated and session is still valid.

The Active Project—Human Resources page 432 permits the user to define or update the Active Project—Human Resources details of an active project. The save button will appear for active projects whose Active Project—Human Resources information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Active Project—Human Resources page displays specific questions regarding the Human resources aspect of an active project. A set of answers for each question are presented but only one can be selected. There are two (2) buttons at the end of the page. These are the Save/Update button and the Clear button. The Save button appears for active projects whose human resources information has not yet been defined. The Update button appears for active projects whose Human Resources information has been previously defined.

The contents of this page are dynamically loaded based on the data retrieved from the different tables in the database based on the category. This page is located in the questionnaires directory and is protected through user authentication. All users will be allowed to view this page once they have been authenticated and session is still valid.

The Active Project—Quality page 434 permits the user to define or update the Active Project—Quality details of an active project. The save button will appear for active projects whose Active Project—Quality information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Active Project—Quality page displays specific questions regarding the Quality aspect of an active project. A set of answers for each question are presented but only one can be selected. There are two (2) buttons at the end of the page. These are the Save/Update button and the Clear button. The Save button appears for active projects whose Quality-related information has not yet been defined. The Update button appears for active projects whose Quality-related information has been previously defined.

The contents of this page are dynamically loaded based on the data retrieved from the different tables in the database based on the category. This page is located in the questionnaires directory and is protected through user authentication. All users will be allowed to view this page once they have been authenticated and session is still valid.

The Active Project—Risk page 436 permits the user to define or update the Active Project—Risk details of an active project. The save button will appear for active projects whose Active Project—Risk information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Active Project—Risk page displays specific questions regarding the Risk aspect of an active project. A set of answers for each question are presented but only one can be selected. There are two (2) buttons at the end of the page. These are the Save/Update button and the Clear button. The Save button appears for active projects whose Risk-related information has not yet been defined. The Update button appears for active projects whose Risk-related information has been previously defined.

The contents of this page are dynamically loaded based on the data retrieved from the different tables in the database based on the category. This page is located in the questionnaires directory and is protected through user authentication. All users will be allowed to view this page once they have been authenticated and session is still valid.

The Active Project—Schedule page 438 permits the user to define or update the Active Project—Schedule details of an active project. The save button will appear for active projects whose Active Project—Schedule information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Active Project—Schedule page displays specific questions regarding the Schedule aspect of an active project. A set of answers for each question are presented but only one can be selected. There are two (2) buttons at the end of the page. These are the Save/Update button and the Clear button. The Save button appears for active projects whose Schedule-related information has not yet been defined. The Update button appears for active projects whose Schedule-related information has been previously defined.

The contents of this page are dynamically loaded based on the data retrieved from the different tables in the database based on the category. This page will be located in the questionnaires directory and is protected through user authentication. All users will be allowed to view this page once they have been authenticated and session is still valid.

The Active Project—Scope page 440 permits the user to define or update the Active Project—Scope details of an active project. The save button will appear for active projects whose Active Project—Scope information has not yet been defined. Otherwise, an update button will appear. There is a score corresponding to a question/answer combination which will be used to determine the color classification to be displayed in the reports. The user can save the data in the database at any point, at any level of completion, but can only advance to the next page once all the questions have been answered. After saving the data in the database and if all the questions in the page have been answered, the user will be asked if he wants to proceed to the next page or go back to the home page.

The Active Project—Scope page displays specific questions regarding the Scope aspect of an active project. A set of answers for each question are presented but only one can be selected. There are two (2) buttons at the end of the page. These are the Save/Update button and the Clear button. The Save button appears for active projects whose Scope-related information has not yet been defined. The Update button appears for active projects whose Scope-related information has been previously defined.

The contents of this page are dynamically loaded based on the data retrieved from the different tables in the database based on the category. This page will be located in the questionnaires directory and is protected through user authentication. All users will be allowed to view this page once they have been authenticated and session is still valid.

The Password Maintenance page 404 (shown twice in FIG. 4 for ease of following) allows all types of users to update his/her password after a successful login provided that they have clicked on the Change Password option from the login page 402. The password page will be located in the root directory and is protected through user authentication. All users will be allowed to view this page once they have been authenticated and session is still valid.

The Security page 442 allows the security (SEC)-privileged users to update the password of other users using the Password maintenance page 404 and to add, update or delete (deactivate only in the database) a user using the User maintenance page 444. For the Password Maintenance page 404, all fields are required to be filled up by the user. For the User maintenance page 444, all fields are also required to be filled up when adding or updating user information. The Login ID is automatically generated upon creation of a new user. To delete a user, simply set the Active Status to No. For non SEC-privileged and non-ADMIN privileged user, set the Admin and Sec privilege flag to No respectively.

The Security page 442 contains the Password and User Maintenance tools and is only accessible for users with the SEC privilege. The User Maintenance feature provides SEC-privileged users the functionality to add, update or delete (deactivated only in the database) users. To update or delete a user, simply enter the login name and click the search button to retrieve user data, then make the necessary changes and click the save button to update changes. To add a user, fill up all the required fields and click the save button to add the user. The Password Maintenance feature provides SEC-privileged users the functionality to change other user's passwords.

The password field will be hashed using the MD5 algorithm before saving the data in the database. To store a password in the database, a random set of two salt characters will be generated and added to the front of the password supplied to make a new password string. The new password string is then hashed using the MD5 algorithm to obtain a new hashed password string converted to an ASCII hex string creating a "hexified" password string. The salt characters are then added to the front of the "hexified" password string and then stored in the database.

The security page will be located in the root directory and is protected through user authentication. Only users with SEC privileges will be allowed to view this page once they have been authenticated and session is still valid.

The Add Customer/Manager page 446 allows ADMIN-privileged users to add a customer or project manager. To add a customer, simply fill in the customer name and click on the Enter customer button. The customer ID is automatically generated upon creation of a new customer. To add a project manager, fill in the project manager first name and last name and click on the Enter Project Manager button. The project manager ID is automatically generated upon creation of a new project manager.

The Add Customer/Manager page is only accessible to users with the ADMIN privilege. The Add Customer function 448 allows ADMIN-privileged users to add a new customer to the system. The Add Project Manager function 450 allows ADMIN-privileged users to add a new project manager to the system.

This Add Customer/Manager page will be located in the root directory and is protected through user authentication. Only users with ADMIN privileges will be allowed to view this page once they have been authenticated and session is still valid.

The Project Initiation—Summary Report page 452 allows users to filter the newly-initiated project reports (not yet active) by Customer Name, Project Name, Project Manager, and Project Type. The user also has the option to select which type of Project Initiation report to generate (the available options include Identification/Team Dynamics/Assessment Info report 454, Project Stated Risk Info report 456, and Planned Project Baseline Info report 458). After selection, clicking on the Create Report button initiates creation of an online report. Clicking on the Clear button resets to default values all the input controls.

The Project Initiation Summary Report allows users to filter the newly-initiated project reports (not yet active) by Customer Name, Project Name, Project Manager, and Project Type. The user has also the option to select which type of Project Initiation report to generate. The available Project Initiation reports include Identification/Team Dynamics/Assessment Info, Project Stated Risk Info, and Planned Project Baseline Info.

This page will be located in the reports directory and is protected through user authentication. All users will be allowed to view this page once they have been authenticated and session is still valid.

The Project Initiation—Identification/Team Dynamics/Assessment Report 454 shows the general assessment of the project in terms of Schedule, Scope, Risk, Human Resources, and Quality. Assessments are based on the information provided by the users from the Project Initiation pages.

The Project Initiation—Project Stated Risk Report 456 shows the assessment of potential risk items per project. This includes Technology, Delivery Date, Quality, Customer Satisfaction, Constraints and other miscellaneous risk items, including Critical Success Factors to be observed both for the customer and the developing organization.

The Project Initiation—Planned Project Baseline Report 458 shows planning values which include start date, end date, hours budget, and staff size for each phase of a project.

The Project Initiation—Details Report 460 serves as the facility for users to select a specific project to which different information which include Constraints 462, Risk 466, Critical Success Factors for Customer 468, Critical Success Factor for Developing Organization 470, Technologies 472, Asset Requirements 474, Special Communication Requirements 476, and Other Comments 478 can be viewed instantaneously.

This page will be located in the reports directory and is protected through user authentication. All users will be allowed to view this page once they have been authenticated and session is still valid.

The Active Project report page 480 allows users to filter the active project reports by Customer Name, Project Name, Project Manager, Project Type and Status. There is an option to select which type of Project report to generate. The available reporting options include Identification/Project Details/Project Management Info, Analysis and Business Design Planning vs. Actual, Technical Design and Construction Planning vs. Actual, Testing and Implementation Planning vs. Actual, and Assessment.

This page is located in the reports directory and is protected through user authentication. All users will be allowed to view this page once they have been authenticated and session is still valid.

The Project—Identification/Project Details/Project Management Report 482 shows merging values from the identification and project details report and the project management information report. Issue tracking report values are included.

The Project—Analysis/Business Design Report 484 displays "Planned" values compared against "Actual" values for Start Date, End date, Hours Budget, and Staff Size of the Analysis and Business Design phases of active projects.

The Project—Technical Design/Construction Report 486 displays "Planned" values compared against "Actual" values for Start Date, End date, Hours Budget, and Staff Size of the Technical Design and Construction phases of active projects.

The Project—Testing/Implementation Report 488 displays "Planned" values compared against "Actual" values of Start Date, End date, Hours Budget, and Staff Size of the Testing and Implementation phases of active projects.

The Project—Assessment Report 490 displays comparisons between current and previous assessment of Schedule, Scope, Risk, Human Resources, Quality and Cost of active projects.

FIG. 5 shows a main screen flow chart. The user can log in, using the login screen 402, or change the password using the "change password" screen 404, and is brought to the home page 406. The home page 406 includes a list of options 502 including the following: return to home page 504, create a new project 506, view an existing project 508, project initiation 510, reports 512, administration 514, and logout 516.

FIG. 6 shows an administration screen flow chart of events that occur when the user chooses the administration option 514 of FIG. 5. From an administration page 602, a SEC privileged user can go in step 604 to the security page 442, while an admin privileged user can go in step 606 to the add customer/manager page 446.

FIG. 7 shows a project initiation screen flow chart of events that occur when the user chooses the project initiation option 510 of FIG. 5. From the Project Initiation—General page 412, the user can go to a list of options 702, including home 504, create new project 506, view existing project 508, baseline statistics 426, active project 428, and reports 512. The user can alternatively go to the Project Initiation—Assessment page 404 and thence to human resources 416, quality 418, risk 420, schedule 422, and scope 424.

FIG. 8 shows an active project screen flow chart. From the active project page 428, the user can go to the cost 430, human resources 432, quality 434, risk 436, schedule 438, and scope 440. Alternatively, the user can go to a list of options 802, including home 504, create new project 506, view existing project 508, project initiation—general 412, project initiation—assessment 414, baseline statistics 426, reports 512, and logout 516.

FIG. 9 shows a flow chart of the reports when the user selects the reports option 512. From the reports option 512, the user can go to the project initiation summary report 452, the project initiation detail reports 460, or the active project report 480. The user can alternatively go to a list of options 902 including home 504, create new project 506, view existing project 508, project initiation 510, and logout 516.

Figure 10:
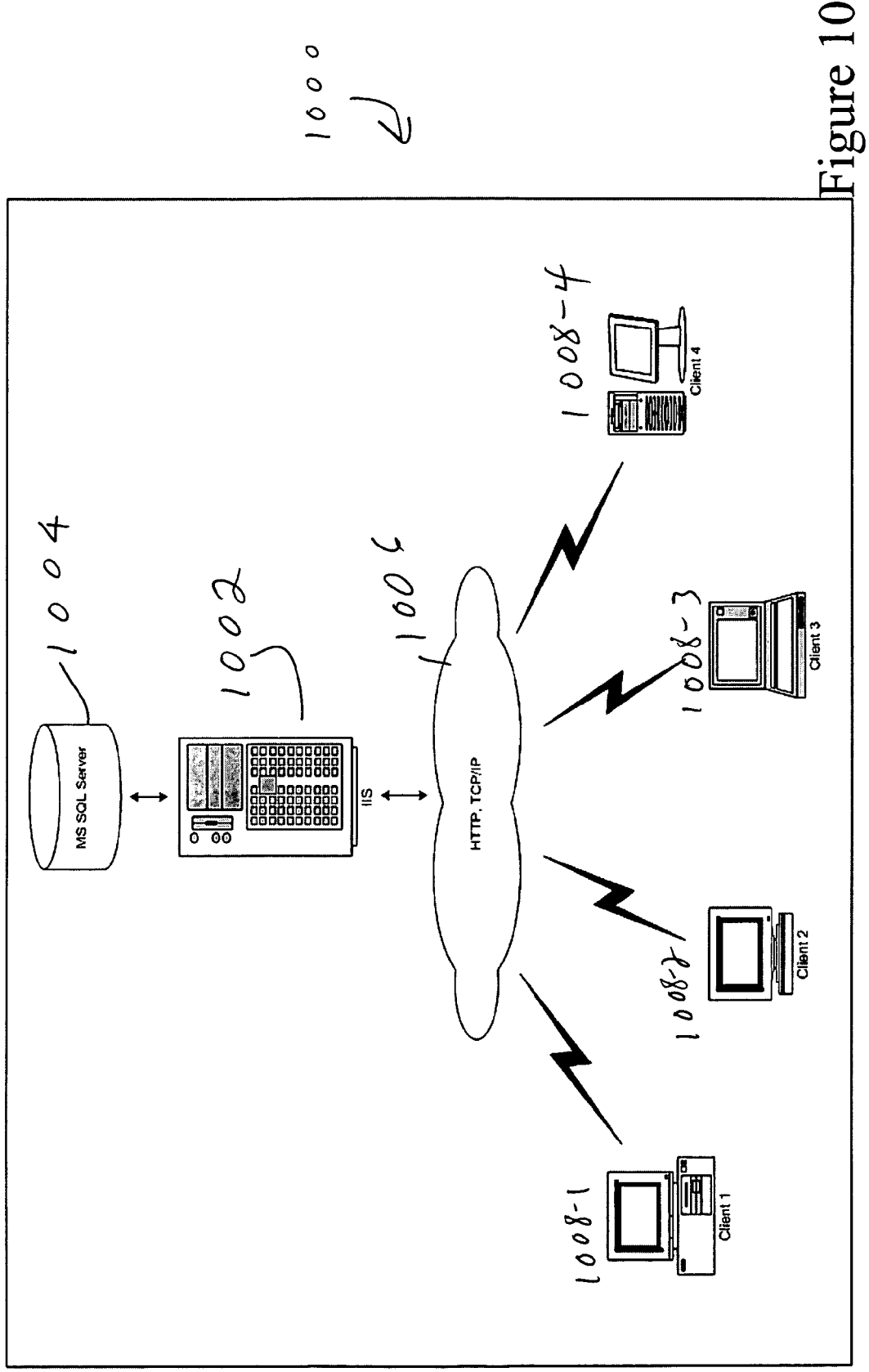
FIG. 10 shows a schematic diagram of a hardware configuration on which the preferred embodiment can be implemented

FIG. 10 shows a schematic diagram of a hardware configuration 1000 on which the preferred embodiment can be implemented. Those skilled in the art who have reviewed the present disclosure will readily appreciate that other suitable hardware can be used instead. It will also be understood that trademarks are used for identification purposes only. A Microsoft Windows NT Server platform 1002 runs Microsoft Internet Information Server (IIS) and a standard OLE DB Connection to a database server 1004 running Microsost SQL Server 2000. The server 1002 communicates via standard protocols 1006 such as HTTP and TCP/IP with various clients, shown as client 1 1008-1, client 2 1008-2, client 3 1008-3, and client 4 1008-4. The communication can take place over the Internet, an intranet, or any other suitable network.

Additional details on the functionality of the preferred embodiment will now be set forth. Language like "needs," "must," and "requires" refer to the preferred embodiment only and are not intended, nor should they be construed, as limitations on the invention as a whole.

Security for the PMO provides for user authentication as well as authorization for data entry/update and reporting.

The security mechanism addresses the following scenarios:
- Stand-alone operation (all security is handled within the PMO application)
- Integration with Tracer™ Version 2 Release 1.x or greater security
- Ability to integrate with other security mechanisms without modification to the core of the application (e.g., LDAP for based authorization and authentication, other proprietary mechanisms).
- Local Hosting of the PMO System for several Remote Customers which would include:
  - Segregation of Administrator rights, so that an admin in one account can not access another organization/company's admin functions.
  - Segregation of users according to organizational/company boundaries.
- Access to the PMO system for anywhere, at any time.

Access is limited to authenticated (a login mechanism) and PMO authorized users.

The authorization mechanism must support user groups (or user classes).

Project data and reports are restricted to specifically authorized users or groups for each project.

The ability exists to log and track the users that log in to and use the PMO in order to monitor utilization.

The PMO has a tailorable question pool that can be adjusted for each organization using the PMO. A base question pool, with the capability to select or reject the use of various questions, is included in the product. In addition to the global question pool, a mechanism for adding new, organization specific questions must be available. The definition of new questions must support the risk analysis and health reporting the same as if the questions are part of the base question pool.

Questions are tiered (layered), as well as classified according to the project type. Each project is given a "tier control level" that dictates the question depth. The line of questioning is controllable at both a project and a global level, allowing the question "depth" to be set with the project. The questions are also dictated by the project type, and the classification of each question according to project type (e.g., new development questions are only be presented for projects that are classified as new development; level 2 or deeper questions are only be presented for projects which have be set to that level or deeper).

All questions are assigned levels, project types, risk categories, life-cycle timing, risk factors (for each possible answer), and reactions to answers including but not limited to: If other questions will be opened or closed, if status will change, and if a notification will be activated, all depending on certain answers.

The Question Pool has a Maintenance function built into the program that allows for creating, changing, and removing questions from the Pool. This function will be open only to users with certain access permissions, and will allow the end user to manage and create their own questions as well as the pre-packaged question set. This includes notifications that will detail any continuity issues that may arise when a question is deleted. There is also some consideration as to predicting potential conflicts between questions as new ones are added to the system.

The user can create custom questions sets that will apply to certain project types. In order to accomplish this, there needs to be a system to allow for the dynamic building of question sets from the complete question pool. This system can identify relationships between questions, so that when the user goes to save their new question set, they can be notified if they picked one question from the middle of hierarchy of questions, that there are other questions that should come with it.

The Maintenance function contains a function that will allow for the display of the different question sets based upon which project type they are assigned to. A user would come to this section, select a project type, and the program displays the list of questions that are assigned to that type.

The Maintenance function has a Periodic Review section. This is based off of the date created field attached to each question. The user will select an interval at which Questions will be marked for review, showing that the questions should be revisited to determine if they are still applicable or need to be edited. Once they have reviewed and updated if necessary, they will be able to mark the question as approved and it will not be flagged until the interval has passed again.

The Project Profile and Inventory provides a list of all projects under the PMO and profiles describing general and some technical aspects of each project. Use of the inventory provides information on past and current projects, their results, and allows comparison of project performance with other projects based on profile information.

The system has a means of adding, updating, and deleting project profile information by properly authorized users. Each operation (add, update, delete) is discretely assignable to authorized users.

The project asset classes are based on the MIT model for classification. The meanings of the classes are described below.

Infrastructure provides a shared, standardized capability base for the enterprise. Infrastructure projects lead to greater business flexibility and integration. Infrastructure investments are moderately risky because of their technologies' (typically) long life-spans and technical uncertainty.

Transactional initiatives process and automate the basic transactions of the company. They intend to reduce costs and increase productivity. Usually these kinds of projects have and internal rates of return between 25 and 40 percent. These investments have the least risk of the four classes.

Informational systems provide information for managing the company. Their payoff comes from shorter time-to-market, superior quality, and the ability to set premium prices. They are moderately risky because companies often have difficulty acting on information to generate business value.

Strategic systems are typically external-facing. Payoff is in sales growth, competitive advantage, and stronger market positioning. These are high risk. Typically, 10% will have great results, but 50% will not break even.

There is the ability to Custom Define a new Project Asset Class scheme, as well as edit the Pre-Packaged solution in case the original system does not fit the user's business, or in case they already have a pre-existing method to handle this data.

The program has functionality that will allow and manage the situation where two or more projects combine into one project at any given point in the projects' life cycles.

The adverse also needs to be handled, where the situation occurs that one project splits into multiple separate projects.

Performance tracking provides information over the life of a project as to how it is performing against task completion, costs, schedule (milestones), quality, and customer satisfaction. The tracking uses defined thresholds and indicators to identify when a performance area is showing signs of trouble, and coupled with the risk analysis, helps to determine not only when action is needed, but what kind of action as well. Performance tracking requires storing data attributes (measurements) and sets of measurements for each project.

The PMO must support integration: with Tracer™ or integration with Microsoft Project as a means of automating appropriate data gathering and calculations, and it must also support manual, stand-alone data collection.

The Earned Value Management measures, tracked in the performance data are key indicators showing the performance of the project, as well as providing budget and schedule projections for the project. Earned value management is based on the following general measurements.

Status Date: The date associated with the measures being analyzed.

Planned Value (formerly Budgeted Cost of Work Scheduled or BCWS): the cost of the work scheduled or planned to be completed in a certain time period according to plan.

Earned Value (formerly Budgeted Cost of Work Performed or BCWP): the planned cost of the work done up to a defined point in the project.

Actual Cost (formerly Actual Cost of Work Performed or ACWP): the actual cost of work up to a defined point in the project.

Budget At Completion: the sum of all costs allocated to the project.

Planned Duration: the number of days the project is scheduled to be performed over.

Schedule Variance: (Answers: How far ahead or behind on the schedule?).

Cost Variance: (Answers: How far ahead or behind on the budget?)

Schedule Performance Index (SPI). (Answers: Is the project on schedule?).

When calculating the SPI, it can be done in two different ways:

Cumulative—Going from the start of the project to the SD (Status Date).

Averaged—Average over a recent period of time up to the SD. For example, 3 month and 6 month averages are meaningful between 25% and 100% completion for a project of adequate size to allow such durations; shorter duration projects can use smaller periods of time like 1 and 3 month averages. The cumulative SPI is given the identifier $SPI_{cum}$, while the averaged SPI is given identifiers $SPI_1$, $SPI_3$, $SPI_6$ for 1, 3, and 6 month averages respectively.

Cost Performance Index (CPI): (This is the inverse of the performance ratio (AC/EV) used by CAI. (Answers: Is the project on budget?).

When calculating the CPI, it can be done in two different ways:

Cumulative—Going from the start of the project to the SD (Status Date).

Averaged—Averages over a recent period of time up to the SD. For example, 3 month and 6 month averages are meaningful between 25% and 100% completion for a project of adequate size to allow such durations; shorter duration projects can use smaller periods of time like 1 and 3 month averages. The cumulative CPI is given the identifier $CPI_{cum}$, while the averaged CPI is given identifiers $CPI_1$, $CPI_3$, $CPI_6$ for 1, 3, and 6 month averages respectively.

Cost Schedule Index (CSI). Also know as the Critical Index. CSI=CPI×SPI. The farther from 1.0 the index is, the less likely the chances of recovery. Specifically:

0.9<CSI<1.2: Good.

0.8<CSI<09 or 1.2<CSI<1.3: Check and take action.

CSI<0.8 or CSI>1.3: Serious problems exist, with little chance of recovering the schedule/budget.

The CSI is either a cumulative CSI or an averaged CSI, depending on which SPI and CPI are used. The choice of the SPI and CPI for the calculation must be the same; they will either be the cumulative or one of the (same) averages, e.g., it is incorrect to use $SPI_1$ and $CPI_3$:

Estimate To Complete. The remaining budget

Estimate At Completion. The calculated estimate for the project budget needed to complete the work (based on project performance indexes)

The index can be any one of the SPI, CPI, or CSI. Preference is for CPI or CSI. CPI gives the "most likely" EAC, and CSI gives a "pessimistic" EAC. Both the cumulative or averaged index can be used, and it is useful to be able to compare indexes to each other to establish a small range of possible outcomes.

Forecast At Completion: Calculated estimate for the project budget needed to complete the work. This is traditionally the way many projects forecast the cost. The EAC is a better indicator (FAC is typically very low in its forecast).

Planned Duration: The calculated duration of the project according to the baseline Forecasted Duration: The calculated estimate for the remaining duration of the project Variance At Completion: The calculated variance of the project's forecasted completion vs. the budgeted completion Percent Complete: The percent of the budget that has been completed Planned Percent Complete: The percent of the budget that is planned to be completed.

Percent Spent: The percent of the budget that has actually been used.

To Complete Performance Index (Baseline): Required cost performance to meet the baseline (original budget).

Improvement Ratio (Baseline): Required cost performance improvement to meet the baseline (original budget), given by $$IR_b = \left(\frac{TCPI_b}{CPI} - 1\right)$$

Required OverTime: Required overtime to recover the schedule variance, given by $$ROT = \frac{SV}{CPI}$$

Estimated Completion Date: Estimated date when the work will be completed based on schedule performance, given by $$ECD = CurDate + \frac{PlannedEndDate - CurDate}{SPI}$$

Automatic risk analysis and reporting based largely on research by the SEI reported in the *Taxonomy-Based Risk Identification* (document CMU/SEI-93-TR-6, published by Carnegie Mellon University, June 1993, hereby incorporated by reference in its entirety into the present disclosure). Using question responses and quantitative data (attributes) from projects, risk factors are be automatically assessed, reported and tracked for each project.

Each Question and data attribute has an assigned risk category, and is assigned a risk weight that can be with positive or negative. The risks are aggregated into the categories defined in SEI-93-TR-6, and used to provide an assessment of the areas of risk in the project.

The risk analysis also provides guidance on both mitigating/avoiding certain risks and guidance on addressing realized risks. Mitigation strategies are taken from Capers Jones' work, *Assessment and Control of Software Risks* (ISBN 0-13-741406-4) (hereby incorporated by reference in its entirety into the present disclosure).

The question pool is tiered so that the level of detail in the questioning for a project can be adjusted to an appropriate level.

Each question and data attribute is assigned a risk factor either based upon a particular answer, or particular value. These factors are combined to produce a risk score in each area of risk classification.

The Risk Analysis is reported as part of the Health and Status Analysis, giving a stop light (Green, Yellow, and Red) indicator of each of the risk areas. The indicator can be clicked on to drill down to see the elements that make-up that risk value. Each risk element can also be drilled down into to see more and more detail about the risk. In addition, each risk element provides guidance on risk mitigation approaches.

The risk classifications assigned to each question and attribute are those used for aggregating information related to the software risks as identified in *Taxonomy-Based Risk Identification* (document CMU/SEI-93-TR-6).

Each classification is broken down into a set of elements, that further organize the questions and attributes. Each element is then broken down to a risk attribute. The following subsections show the structure.

Product Engineering refers to the technical aspects of the work to be performed.

Requirements cover both quality of the requirements and the difficulty of implementing a system that satisfies the requirements.

Are the requirements changing even as the product is being produced?
Are the requirements missing or incompletely specified?
Are the requirements unclear or in need of interpretation?
Will the requirements lead to the product the customer has in mind?
Are the requirements feasible from an analytical point of view?
Do the requirements specify something never done before, or that the company has never done before?
Do the requirements specify a product larger, more complex, or requiring a larger organization than is in the experience of the company?

Design covers the design and feasibility of algorithms, functions or performance requirements, and internal and external product interfaces.

Are there any potential problems in meeting functionality requirements?
Are the designs unclear or in need of interpretation?
Will the design and/or implementation be difficult to achieve?
Are the internal interfaces (hardware and software) well defined and controlled?
Are there stringent response time or throughput requirements?
Is the product difficult or impossible to test?
Are there tight constraints on the target hardware?
Are there problems with software used in the project, but not developed by the project?

Code and Unit Test deals with the quality and stability of software or interface specifications, and constraints that may present implementation or testing difficulties.

Is the implementation of the design difficult or impossible?
Are the specified level and time for unit testing adequate?
Are there any problems with coding and implementation?

Integration and Test covers integration and test planning, execution, and facilities for both the contractual product and for the integration of the product into the system or site environment.

Is the integration and test environment adequate?
Is the interface definition inadequate, facilities inadequate, time insufficient?
System integration uncoordinated, poor interface definition, or inadequate facilities?

Engineering Specialties covers special requirements that are usually addressed by specialists, and those often on a part-time basis for the project.

Will the implementation be difficult to understand or maintain?
Are the reliability or availability requirements difficult to meet?
Are the safety requirements infeasible and not demonstrable?
Are the security requirements more stringent than the current state or the practice or project experience?
Will the system be difficult to use because of a poor human interface definition?
Is the documentation adequate to design, implement, and test the system?

The methods, procedures, and tools used to produce the product.

The Development Process refers to the process by which the project proposes to perform the work specified by the requirements.

Will the implementation be difficult to understand or maintain?
Is the process suited to the development model (e.g., waterfall, spiral, prototyping, etc.)?
Is the software development process enforced, monitored, and controlled using measurements? Are distributed development sites coordinated?
Are the project members experienced in use of the process? Is the process understood by all staff members?
Are there mechanisms for controlling changes to the product?

The Development System addresses the hardware and software tools and supporting equipment used in product development.

Is there sufficient workstation processing power, memory, or storage capacity?
Does the development system support all phases, activities, and functions?
How easy is the development system to use?
Is there little prior company or project member experience with the development system?
Does the system suffer from software bugs, down-time, insufficient built-in backup?
Is there timely expert or vendor support for the system?
Are the definition and acceptance requirements defined for delivering the development system to the customer budgeted?

The Management Process deals with risks associated with planning, monitoring, and controlling budget and schedule;

controlling factors in defining, implementing, and testing the product; managing project personnel; and handling external organizations.

Is the planning timely, technical leads included, contingency planning done?

Are the roles and reporting relationships clear?

Are the managers experienced in software development, software management, the application domain, the development process, or on large projects?

Is there poor interface with customer, other contractors, senior and/or peer managers?

Management Methods refers to methods for managing both the development of the product and project personnel.

Are management measurements defined and development progress tracked?

Are project personnel trained and used appropriately?

Are there adequate procedures and resources to assure product quality?

Are the change procedures and version control (including installation sites) adequate?

Work Environment deals with the subjective aspects of the environment.

Is there a lack of orientation toward quality work?

Is there a lack of team spirit? Does conflict resolution require management intervention?

Is there poor awareness of mission or goals, poor communication of technical information among peers and managers?

Is there a non-productive, non-creative atmosphere? Do people feel that there is no recognition or reward for superior work?

Project Constraints is called Program Constraints in SEI-93-TR-6. The contractual, organizational, and operational factors within which the software is developed, but which are generally outside of the direct control of the local management.

Resources address resources that the project is dependent on but are outside the project's control to obtain and maintain.

Is the schedule adequate and stable?

Is the staff inexperienced, lacking domain knowledge, lacking skills, or understaffed?

Is the funding insufficient or unstable?

Are the facilities adequate for building and delivering the product?

Contract deals with risks associated with the project contract.

Is the contract type a source of risk to the project?

Does the contract cause any restrictions?

Does the project have any dependencies on outside products or services?

Is the scope of the contract too broad and lacking specificity?

Project Interfaces deals with the various interfaces with entities and organizations outside the product development itself.

Are there any customer problems such as: lengthy document approval cycle, poor communication, and inadequate domain expertise?

Are there any problems with associate contractors such as inadequately defined or unstable interfaces, poor communication, or lack of cooperation?

Is the project dependent on subcontractors for any critical areas?

Is the project facing difficulties with its Prime Contractor?

Is there a lack of support or micro management from upper management?

Are vendors responsive to project needs?

Are politics causing a problem for the project?

The Portfolio Health and Status Analysis provide a simple, high level view of the performance data, and indicate on-track, drifting, or off-track. Each project in the portfolio is shown, and the ability to drill down to greater detail on each project allows managers and executives the ability to see the project at just the level they need to follow and manage the results.

The basis of the health and status analysis is a number of attributes for the execution of the project, along with attributes for calculated performance limits. The various thresholds and limits are used to calculate and assign a heath status for the relevant measure. The status is to be displayed in a "stoplight" fashion: green, yellow, and red; for ok/on-track, drifting, and trouble respectively.

Financial data is tracked and displayed for each project, with the ability to control time periods, and organization units and roll-ups. The data includes general expenses, payroll, and project revenue/income.

The financials are displayable by business (organizational) unit, with the ability to combine organizational units into a composite view. The organizational units to be combined are selectable by the user, and selections persist across application sessions.

All financials must have the ability to be displayed at resolutions of: weekly, monthly quarterly, and yearly, with an optional ability to show the previous year against the current year (with the same time resolution).

Key Goal Tracking allows an organization to list and conveniently report the current status of its key goals. A key goal is a quantifiable target of achievement that can be monitored and the status of meeting said goal can be displayed based upon data, e.g.: 25% Cost Reduction, 99.2% SLA Met.

Each key goal has an assignable owner, that is, the person who is responsible for tracking and updating the status of the key goal.

There is a Key Goal maintenance page where Key Goals can be created, edited and deleted. The Key Goal owner and administrators have the ability to update the health status of the goal, using a "stop-light" indicator (green, yellow, and red), as specified earlier for displaying of various health status indicators. From this maintenance page, the owner and administrators will be able to define checkpoints along the course to satisfying the Key Goal, which will include a deadline for each. Once created, these checkpoints will exist under the Key Goal and can be checked off once they are completed. If the deadline on a checkpoint has passed without being completed, the status of that Key Goal needs to be set to Red. Checkpoints can be added, edited and removed at any time.

Objective Tracking allows an organization to list and conveniently report the current status of its objectives. An objective is, unlike a Key Goal, a non-quantified target of achievement. While an objective may be monitored and tracked, a status decision for an objective is based more upon the reporting manager's thoughts on progress, than upon data, e.g.: SLA Improvements, Increase Level 1 Helpdesk Resolution.

As with the Key Goals, there is a maintenance page with a system to track tasks within each objective. Each objective has an assigned owner, who is able to update the tasks within the objective. Each task within the objectives will have a description, a deadline date, and a check box to be checked once the task has been completed. If the deadline on a task has passed without being completed, the status of that objective needs to be set to Red. Tasks can be added, edited and removed at any time by the Objective owner or an administrator.

Multi-level reporting allows varying details levels of the projects to be reported, from easy to read "stop-light" type charts, to line and bar graphs, to data sheets. These reports allow managers and executives to see appropriate detail levels for each project and area of interest.

Each user, when logging in to the PMO, will be presented with a view of the various analysis, risk, and data components that they have selected to see.

There is a standard view provided for users who have not customized their view. The standard view will show information about what would encompass the set of items that fall under that user's area of responsibility as defined by the authorizations given the particular user.

A project manager will see an overview of all projects he is responsible for.

An IT manager will see a higher level summary of the projects that are under his control, with the ability to drill down to the project level as desired.

Executive managers will see a summary of the entire portfolio, with the ability to drill down to the project level as desired.

In addition to the standard reports and views, the PMO must support ad hoc reporting (using tools like e.g., Crystal Reports).

Using the MIT model of portfolio asset classification, the balance of the portfolio across Infrastructure, Transactional, Informational, and Strategic classifications is determined for tracking and comparison against the company's strategic focus.

The analysis uses a portfolio pyramid that is described by the following descriptions. At the base are the infrastructure investments. Built on that base are the transactional systems (which need a reliable infrastructure). At the top are the information producing and strategic systems.

The PMO, using the data gathered, along with this model, will analyze the investment distribution. This distribution is used to evaluate the orientation of the IT portfolio and determine the level of alignment with the company's strategic focus.

There needs to be the ability to Custom Define a new Portfolio Balance scheme, as well as edit the Pre-Packaged solution in case the original system does not fit the user's business, or in case they already have a pre-existing method to handle this data.

There needs to be a second Portfolio Balance Analysis system that will allow the balance of all current projects to be displayed based off the Business Area field in the Project Profile. This will allow the user to see the distribution of the Portfolio based on the business areas the projects are operating beneath.

This is a dynamically generated display method, since the number of Business Areas varies between different users. Once viewing the distribution, the user can select any of the Business Areas and be directed to a list of all the projects within the Business Area, in the format described in the Portfolio Summary View, detailed later in this document.

The Effort Distribution Analysis provides a manager with the ability to place a general effort breakdown of the project in the system for analysis and project plan validation. The effort breakdown is based on a table of percentages of total effort for each major phase in the lifecycle, based on aggregate measures of completed projects. Such a table is tunable and verified by the application such that all roll-ups come to the correct percentages, and the total for the table rolls-up to 100%.

Using the percentages listed in the table, the system will determine if the projects breakdown is reasonable, within a defined threshold for each phase. The indicators are a "stoplight" view of each phase (green, yellow, red) to show where phases may be under or over estimated.

There is an updateable library of project templates, including instructions and samples. The library is browsable by the user and allow viewing and downloading of the templates. Completed templates is uploadable to the system and assigned to (associated with) the particular project to which they pertain. The projects documents are viewable or downloadable by any appropriately authorized user.

The templates include:
Project Plan
Project Charter
Software Development Plan
Quality Plan
Configuration Management Plan
Testing Plan
Issue Tracking Log
Risk Plan
PMO Monthly Report
Project Status Report
Individual Status Report There is a PMO homepage, known as a Dashboard view, which is the initial screen that users will see when they move into the PMO software. It is meant to give a quick, informative overview of the data stored within the PMO. The Dashboard will need to display data, such as, but not limited to:
Graphs
Key Goals
Objectives
List of Projects
Status Indicators where necessary For any stop light indicator throughout the program that is determined via analysis of values, a method must be created to display in which direction these items are varying from the baseline.

On the Dashboard main page, if the mouse pointer hovers over one of the Projects, a pop-up appears to give an overview of the 6 project facet stop light indicators.

The "Project Details" screen is displayed when the user clicks on one of the links populating the Projects List.

All facets of the project are displayed with their corresponding stop light indicators. Each facet is listed as a link to its corresponding data display. Whichever graph or data form is being displayed at the current time is highlighted in this list in an obvious manner. Additionally, the same highlighting is applied to which view the user is currently accessing.

The limits for each facet needs to be manually changeable, and needs to be saved once changed.

The project information such as the sponsor, manager, location, and project type is displayed.

Throughout all of the graphs being shown for the project facets, coloring and format are uniform.

There are always two sets of data displayed for the graphs, the Actual, and the Baseline. The yellow and red thresholds will also be graphed, but these will be based upon a percentage or fixed value, enumerated separately by the user. The graph will have a line for both Actual and Baseline, as well as a variance line both above and below the baseline for the yellow and red thresholds.

The graph, by default, displays 26 weeks. This number is able to be changed within the program to show a user defined date range on a project by project basis. Weeks start on the Sunday of a given week.

The customer satisfaction and quality graphs do not utilize a baseline but rather definable target zones. The attributes associated with these graphs in addition to displaying the zones are the containment percent. The yellow and red lines will denote target zones.

The graph, by default, displays 26 weeks. This number can be changed within the program to show a user defined date range on a project by project basis. Weeks start on the Sunday of a given week.

Input screens for all data and limits (or thresholds) are required.

Graphing is dynamic; that is, it includes a functionality that allows for the user to either define custom graphs, or overlay existing graphs in order to analyze how changes in one graph influence others.

If data entry for the six project facets remains manual, place all data entry for the facets on one page for quick entry of weekly data.

Financial graphs can be displayed in three manners.
Quarterly—The financial data will be displayed by the quarter for the current year.
Monthly—The financial data will be displayed by month for the current year.
Date Range—The financial data will be displayed in a monthly or quarterly view based upon the dates specified by the user.

The data for the financial graph are input and stored in some fashion, either automatically by working with Tracer, or by manual input on the part of the project manager.

There is also a financial graph to display the cumulative totals over the period chosen by the administrator.

Database tables are created to hold required data for displaying the dashboard items. This will include the items being tracked, as well as the detailed data for determining the status.

The system has data supplied weekly, and be able to report on those data on a week-by-week basis. Each portfolio project will have an arbitrary number of weeks of baseline or planned data points, one set for each week for each area. All project/reporting areas will record weekly data point each area (for use in comparing to the baseline, or indicate the current health/status).

The system warns users before they can delete Projects, Key Goals, and Objectives.

This program is very graphic intensive, with at least 6 graphs per project. In order to keep users navigating steadily through the data via any connection, graphics size must be kept to a minimum.

"Portfolio Summary View" will be is a separate page that the user can access from the main page. Perhaps have the icon located at the top of the Portfolio list, next to the label 'Portfolio'. That page will provide a general overview of basic facts regarding all of the projects inside the system. The projects will be sorted into one of two headings, Active and Completed.

All active projects are listed under the "Active" heading and contain the following:
Name—The name of the project.
Overall Status—The red/green/yellow status of the project.
Cost to date—The cumulative cost of the project as listed in the financial section of the project.
Estimated Cost to Complete—This will be a dollar amount, input by the project manager that estimates how much cost is still needed to finish the project, entered on a regular basis.
Project Start—This can be based off the project start date listed in the project creation screen, and just restated here.
Estimated Completion Date—Estimated date when the project can be considered completed.

All completed projects are listed under the "Completed" heading and contain the following:
Name—The name of the project.
Total Cost—The total cost of the project, based on the sum of the entries to the financial section of each project.
Initial Budget—A reiteration of what the initial budget was set at from the Project Creation screen.
On Budget?—This will be one of the red or green indicators. Green meaning less than 10% over initial budget, and red meaning over budget+10%.
Actual Completion Date—Can be drawn from the Project creation screen when a project is completed.
Scheduled Completion Date—a reiteration of the original date the project was scheduled to be completed upon set on the Project Creation screen.
On Schedule?—This will be one of the red or green indicators. Green meaning ahead of schedule or on schedule up to +2 weeks, and red meaning after schedule +2 weeks.

While a preferred embodiment of the invention has been described in detail above, those skilled in the art who have reviewed the present disclosure will readily appreciate that other embodiments can be realized within the scope of the present invention. For example, numerical values are illustrative rather than limiting, as are recitations of specific hardware, software, and programming techniques. Also, the features of the invention can be implemented in a different order from that disclosed herein. Therefore, the present invention should be construed as limited only by the appended claims.

What is claimed is:

1. A method implemented on a computing device for managing a plurality of active projects, the method comprising:
(a) receiving, into the computing device, an input from a user (either a person or an automated program interface (API)) comprising data concerning one of the plurality of active projects;
(b) assessing, in the computing device, a risk for said one of the plurality of active projects based on the input received in step (a);
(c) validating, in the computing device, a plan and a quality of execution for said one of the plurality of active projects based on the input received in step (a);
(d) providing a report from the computing device to the user representing at least one of the risk assessed in step (b) and a result of validation of the plan in step (c), wherein said report comprises advice on mitigation of the risk assessed in step (b); and
(e) providing from the computing device to the user an integrated project management office toolkit of best practices and process asset library representing assets shared among the plurality of active projects, wherein said asserts are used to provide said advice on mitigation of the risk.

2. A method implemented on a computing device for managing a plurality of active projects, the method comprising:
(a) receiving, into the computing device, an input from a user (either a person or an automated program interface (API)) comprising data concerning one of the plurality of active projects;
(b) assessing, in the computing device, a risk for said one of the plurality of active projects based on the input received in step (a);
(c) validating, in the computing device, a plan and a quality of execution for said one of the plurality of active projects based on the input received in step (a); and
(d) providing a report from the computing device to the user representing at least one of the risk assessed in step (b) and a result of validation of the plan in step (c), wherein said report comprises advice on mitigation of the risk assessed in step (b);

wherein step (a) comprises prompting the user to answer a plurality of questions or accept API data relating to the questions, and wherein step (b) is performed in accordance with the answers to the questions received from the user or in response to the API data;

wherein the questions comprise questions which were stored in the computing device independently of said one of the plurality of active projects; and wherein the questions further comprise questions added by the user for said one of the plurality of active projects.

3. A method implemented on a computing device for managing a plurality of active projects, the method comprising:
 (a) receiving, into the computing device, an input from a user (either a person or an automated program interface (API)) comprising data concerning one of the plurality of active projects;
 (b) assessing, in the computing device, a risk for said one of the plurality of active projects based on the input received in step (a);
 (c) validating, in the computing device, a plan and a quality of execution for said one of the plurality of active projects based on the input received in step (a); and
 (d) providing a report from the computing device to the user representing at least one of the risk assessed in step (b) and a result of validation of the plan in step (c), wherein said report comprises advice on mitigation of the risk assessed in step (b);
 wherein step (a) comprises prompting the user to answer a plurality of questions or accept API data relating to the questions, and wherein step (b) is performed in accordance with the answers to the questions received from the user or in response to the API data; and
 wherein the questions comprise questions added by the user for said one of the plurality of active projects.

4. A method implemented on a computing device for managing a plurality of active projects, the method comprising:
 (a) receiving, into the computing device, an input from a user (either a person or an automated program interface (API)) comprising data concerning one of the plurality of active projects;
 (b) assessing, in the computing device, a risk for said one of the plurality of active projects based on the input received in step (a);
 (c) validating, in the computing device, a plan and a quality of execution for said one of the plurality of active projects based on the input received in step (a); and
 (d) providing a report from the computing device to the user representing at least one of the risk assessed in step (b) and a result of validation of the plan in step (c), wherein said report comprises advice on mitigation of the risk assessed in step (b);
 wherein step (a) comprises prompting the user to answer a plurality of questions or accept API data relating to the questions, and wherein step (b) is performed in accordance with the answers to the questions received from the user or in response to the API data;
wherein the questions are taken from a list of questions which is editable by the user.

5. A method implemented on a computing device for managing a plurality of active projects, the method comprising:
 (a) receiving, into the computing device, an input from a user (either a person or an automated program interface (API)) comprising data concerning one of the plurality of active projects;
 (b) assessing, in the computing device, a risk for said one of the plurality of active projects based on the input received in step (a);
 (c) validating, in the computing device, a plan and a quality of execution for said one of the plurality of active projects based on the input received in step (a); and
 (d) providing a report from the computing device to the user representing at least one of the risk assessed in step (b) and a result of validation of the plan in step (c), wherein said report comprises advice on mitigation of the risk assessed in step (b);
 wherein step (d) comprises presenting a stop light on a user interface to the user if either the risk or a result of validation of the plan reaches an unacceptable level.

6. The method of claim 5, wherein the unacceptable level is determined by deriving an index from the data input by the user and comparing the index to a range of acceptable values for the index.

7. A computing device for managing a plurality of active projects, the computing device comprising:
 a user interface for receiving an input from a user (either a person or an automated program interface (API)) comprising data concerning one of the plurality of active projects; and
 a processing device, in communication with the user interface, for assessing a risk said one of the plurality of active projects based on the input received by the user interface, validating plan and a quality of execution for said one of the plurality of active projects based on the input received by the user interface; and providing, by way of the user interface, a report to the user representing at least one of the risk and a result of validation of the plan, wherein said report comprises advice on mitigation of the risk;
 wherein the processing device further provides to the user an integrated project management office toolkit of best practices and process asset library representing assets shared among the plurality of active projects, wherein said assets are used to provide said advice on mitigation of the risk.

8. A computing device for managing a plurality of active projects, the computing device comprising:
 a user interface for receiving an input from a user (either a person or an automated program interface (API)) comprising data concerning one of the plurality of active projects; and
 a processing device, in communication with the user interface, for assessing a risk said one of the plurality of active projects based on the input received by the user interface, validating a plan and a quality of execution for said one of the plurality of active projects based on the input received by the user interface; and providing, by way of the user interface, a report to the user representing at least one of the risk and a result of validation of the plan, wherein said report comprises advice on mitigation of the risk;
 wherein the user interface prompts the user to answer a plurality of questions or accept API data relating to the questions, and wherein the processing device assesses the risk in accordance with the answers to the questions received from the user or in response to the API data;
 wherein the questions comprise questions which were stored in the computing device independently of said one of the plurality of active projects; and
 wherein the questions further comprise questions added by the user for said one of the plurality of active projects.

9. A computing device for managing a plurality of active projects, the computing device comprising:
   a user interface for receiving an input from a user (either a person or an automated program interface (API)) comprising data concerning one of the plurality of active projects; and
   a processing device, in communication with the user interface, for assessing a risk said one of the plurality of active projects based on the input received by the user interface, validating a plan and a quality of execution for said one of the plurality of active projects based on the input received by the user interface; and providing, by way of the user interface, a report to the user representing at least one of the risk and a result of validation of the plan, wherein said report comprises advice on mitigation of the risk;
   wherein the user interface prompts the user to answer a plurality of questions or accept API data relating to the questions, and wherein the processing device assesses the risk in accordance with the answers to the questions received from the user or in response to the API data; and
   wherein the questions comprise questions added by the user for said one of the plurality of active projects.

10. A computing device for managing a plurality of active projects, the computing device comprising:
   a user interface for receiving an input from a user (either a person or an automated program interface (API)) comprising data concerning one of the plurality of active projects; and
   a processing device, in communication with the user interface, for assessing a risk said one of the plurality of active projects based on the input received by the user interface, validating a plan and a quality of execution for said one of the plurality of active projects based on the input received by the user interface; and providing, by way of the user interface, a report to the user representing at least one of the risk and a result of validation of the plan, wherein said report comprises advice on mitigation of the risk;
   wherein the user interface prompts the user to answer a plurality of questions or accept API data relating to the questions, and wherein the processing device assesses the risk in accordance with the answers to the questions received from the user or in response to the API data; and
   wherein the questions are taken from a list of questions which is editable by the user.

11. A computing device for managing a plurality of active projects, the computing device comprising:
   a user interface for receiving an input from a user (either a person or an automated program interface (API)) comprising data concerning one of the plurality of active projects; and
   a processing device, in communication with the user interface, for assessing a risk said one of the plurality of active projects based on the input received by the user interface, validating a plan and a quality of execution for said one of the plurality of active projects based on the input received by the user interface; and providing, by way of the user interface, a report to the user representing at least one of the risk and a result of validation of the plan, wherein said report comprises advice on mitigation of the risk;
   wherein the processing device controls the user interface to present a stop light on a user interface to the user if either the risk or a result of validation of the plan reaches an unacceptable level.

12. The computing device of claim 11, wherein the unacceptable level is determined by deriving an index from the data input by the user and comparing the index to a range of acceptable values for the index.

13. An article of manufacture comprising:
   a storage medium readable by a computing device; and
   code stored on the storage medium, the code for controlling the computing device to manage a plurality of active projects by:
   (a) receiving, into the computing from a user (either a person or an automated program interface (API)) comprising data concerning one of the plurality of active projects;
   (b) assessing a risk for said one of the plurality of active projects based on the input received in step (a);
   (c) validating a plan and a quality of execution for said one of the plurality of active projects based on the input received in step (a);
   (d) providing a report to the user representing at least one of the risk assessed in step (b) and a result of validation of the plan in step (c), wherein said report comprises advice on mitigation of the risk assessed in step (b); and
   (e) providing to the user an integrated project management office toolkit of best practices and process asset library representing assets shared among the plurality of active projects, wherein said assets are used to provide said advice on mitigation of the risk.

14. An article of manufacture comprising:
   a storage medium readable by a computing device; and
   code stored on the storage medium, the code for controlling the computing device to manage a plurality of active projects by:
   (a) receiving, into the computing device, an input from a user (either a person or an automated program interface (API)) comprising data concerning one of the plurality of active projects;
   (b) assessing a risk for said one of the plurality of active projects based on the input received in step (a);
   (c) validating a plan and a quality of execution for said one of the plurality of active projects based on the input received in step (a); and
   (d) providing a report to the user representing at least one of the risk assessed in step (b) and a result of validation of the plan in step (c), wherein said report comprises advice on mitigation of the risk assessed in step (b);
   wherein, in the code, step (a) comprises prompting the user to answer a plurality of questions or accept API data concerning the questions, and wherein step (b) is performed in accordance with the answers to the questions received from the user or in response to the API data;
   wherein the questions comprise questions which were stored in the computing device independently of said one of the active projects; and
   wherein the questions further comprise questions added by the user for said one of the plurality of active projects.

15. An article of manufacture comprising:
   a storage medium readable by a computing device; and
   code stored on the storage medium, the code for controlling the computing device to manage a plurality of active projects by:
   (a) receiving, into the computing device, an input from a user (either a person or an automated program interface (API)) comprising data concerning one of the plurality of active projects;
   (b) assessing a risk for said one of the plurality of active projects based on the input received in step (a);

(c) validating a plan and a quality of execution for said one of the plurality of active projects based on the input received in step (a); and
(d) providing a report to the user representing at least one of the risk assessed in step (b) and a result of validation of the plan said report comprises advice on mitigation of the risk assessed in step (b);
wherein, in the code, step (a) comprises prompting the user to answer a plurality of questions or accept API data concerning the questions, and wherein (b) is performed in accordance with the answers to the questions received from the user or in response to the API data; and
wherein the questions comprise questions added by the user for said one of the plurality of active projects.

16. An article of manufacture comprising:
a storage medium readable by a computing device; and
code stored on the storage medium, the code for controlling the computing device to manage a plurality of active projects by:
(a) receiving, into the computing device, an input from a user (either a person or an automated program interface (API)) comprising data concerning one of the plurality of active projects;
(b) assessing a risk for said one of the plurality of active projects based on the input received in step (a);
(c) validating a plan and a quality of execution for said one of the plurality of active projects based on the input received in step (a); and
(d) providing a report to the user representing at least one of the risk assessed in step (b) and a result of validation of the plan in step (c), wherein said report comprises advice on mitigation of the risk assessed in step (b);
wherein, in the code, step (a) comprises prompting the user to answer a plurality of questions or accept API data concerning the questions, and wherein step (b) is performed in accordance with the answers to the questions received from the user or in response to the API data; and
wherein the questions are taken from a list of questions which is editable by the user.

17. An article of manufacture comprising:
a storage medium readable by a computing device; and
code stored on the storage medium, the code for controlling the computing device to manage a plurality of active projects by:
(a) receiving, into the computing device, an input from a user (either a person or an automated program interface (API)) comprising data concerning one of the plurality of active projects;
(b) assessing a risk for said one of the plurality of active projects based on the input received in step (a);
(c) validating a plan and a quality of execution for said one of the plurality of active projects based on the input received in step a
(d) providing a report to the user representing at least one of the risk assessed in step (b) and a result of validation of the plan in step (c), wherein said report comprises advice on mitigation of the risk assessed in step (b);
wherein, in the code, step (d) comprises presenting a stop light on a user interface to the user if either the risk or a result of validation of the plan reaches an unacceptable level.

18. The article of manufacture of claim 17, wherein the unacceptable level is determined by deriving an index from the data input by the user and comparing the index to a range of acceptable values for the index.

\* \* \* \* \*